US009364887B2

(12) United States Patent
Godon et al.

(10) Patent No.: US 9,364,887 B2
(45) Date of Patent: Jun. 14, 2016

(54) PROCESS FOR MANUFACTURING A METAL PART, SUCH AS TURBINE ENGINE BLADE REINFORCEMENT

(75) Inventors: Thierry Godon, Sevran (FR); Bruno Jacques Gérard Dambrine, Le Châtelet-en-Brie (FR); Alain Robert Yves Perroux, Ris Orangis (FR)

(73) Assignee: SNECMA, Paris (FR)

( * ) Notice: Subject to any disclaimer, the term of this patent is extended or adjusted under 35 U.S.C. 154(b) by 158 days.

(21) Appl. No.: 14/002,506

(22) PCT Filed: Feb. 29, 2012

(86) PCT No.: PCT/FR2012/050423
§ 371 (c)(1),
(2), (4) Date: Aug. 30, 2013

(87) PCT Pub. No.: WO2012/117201
PCT Pub. Date: Sep. 7, 2012

(65) Prior Publication Data
US 2013/0333214 A1    Dec. 19, 2013

(30) Foreign Application Priority Data

Mar. 1, 2011 (FR) ..................... 11 51656
Mar. 1, 2011 (FR) ..................... 11 51658
Mar. 1, 2011 (FR) ..................... 11 51661
Mar. 1, 2011 (FR) ..................... 11 51662

(51) Int. Cl.
*B23K 20/02* (2006.01)
*B21K 3/04* (2006.01)
(Continued)

(52) U.S. Cl.
CPC ............... *B21K 3/04* (2013.01); *B21D 22/022* (2013.01); *B21D 53/92* (2013.01); *B21K 25/00* (2013.01);
(Continued)

(58) Field of Classification Search
CPC ........... B21D 53/78; B22F 5/04; B23P 15/04; C22C 47/20; C22C 49/14; F01D 5/147; F01D 5/282; F04D 29/023; F04D 29/324; B29C 65/48; B29C 65/483; B29C 66/12461; B29C 66/12463; B29C 66/301; B29C 66/53; B29C 66/721; B29C 66/742; Y10T 29/49337; Y10T 29/49336; Y10T 29/49332
See application file for complete search history.

(56) References Cited

U.S. PATENT DOCUMENTS 4,301,584 A    11/1981   Dillner et al.
4,789,770 A *  12/1988   Kasner et al. ............. 219/121.7
(Continued)

FOREIGN PATENT DOCUMENTS

EP    1 908 919    4/2008
FR    2 939 130    6/2010
(Continued)

OTHER PUBLICATIONS

International Search Report as issued for PCT/FR2012/050423.

*Primary Examiner* — Sarang Afzali
*Assistant Examiner* — Ruth G Hidalgo-Hernande
(74) *Attorney, Agent, or Firm* — Pillsbury Winthrop Shaw Pittman LLP

(57) ABSTRACT

A method for producing a metal component such as a metal turbomachine blade reinforcement, includes positioning a plurality of metal staples in a forming tool having a die and a punch; and hot isostatic pressing the plurality of metal staples causing the agglomeration of the metal staples so as to obtain a solid component.

19 Claims, 9 Drawing Sheets

(51) Int. Cl.
  *B21D 22/02* (2006.01)
  *B21D 53/92* (2006.01)
  *B21K 25/00* (2006.01)
  *B22F 3/15* (2006.01)
  *B23P 15/04* (2006.01)
  *C22C 14/00* (2006.01)
  *C22C 29/06* (2006.01)
  *F01D 5/14* (2006.01)
  *F04D 29/32* (2006.01)

(52) U.S. Cl.
  CPC ............... *B22F 3/15* (2013.01); *B23K 20/021* (2013.01); *B23P 15/04* (2013.01); *C22C 14/00* (2013.01); *C22C 29/065* (2013.01); *F01D 5/147* (2013.01); *F04D 29/324* (2013.01); *B23K 2201/001* (2013.01); *F05D 2230/20* (2013.01); *F05D 2240/303* (2013.01); *F05D 2240/304* (2013.01); *Y02T 50/672* (2013.01); *Y02T 50/673* (2013.01); *Y10T 29/49336* (2015.01)

(56) References Cited

U.S. PATENT DOCUMENTS

| | | | |
|---|---|---|---|
| 7,753,643 B2 * | 7/2010 | Gonzalez et al. | 415/1 |
| 8,678,771 B2 * | 3/2014 | Merrill et al. | 416/241 R |
| 2010/0247949 A1 | 9/2010 | VanDyke et al. | |

FOREIGN PATENT DOCUMENTS

| | | |
|---|---|---|
| FR | 2 965 824 | 4/2012 |
| WO | WO 2011/081762 | 7/2011 |

* cited by examiner

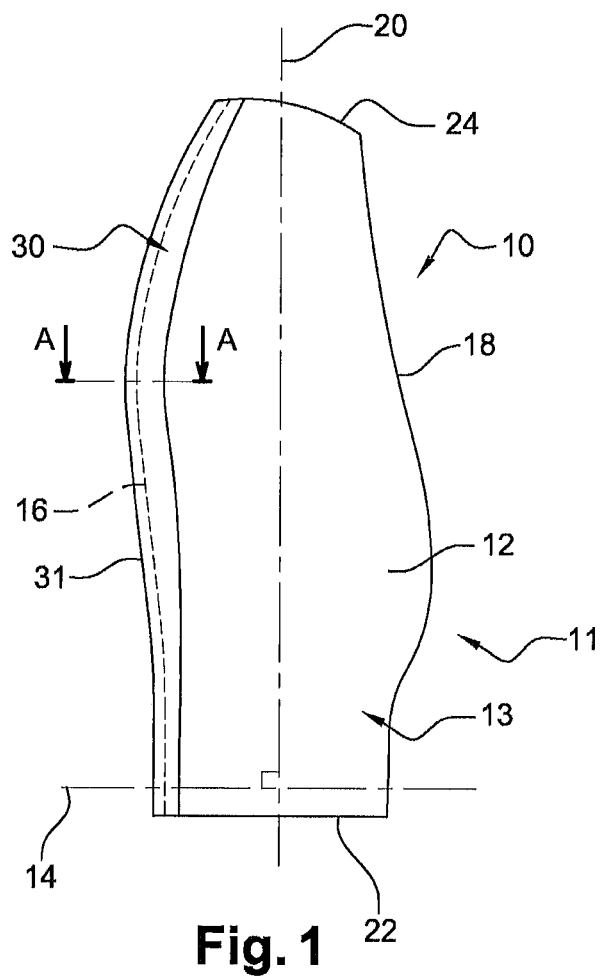
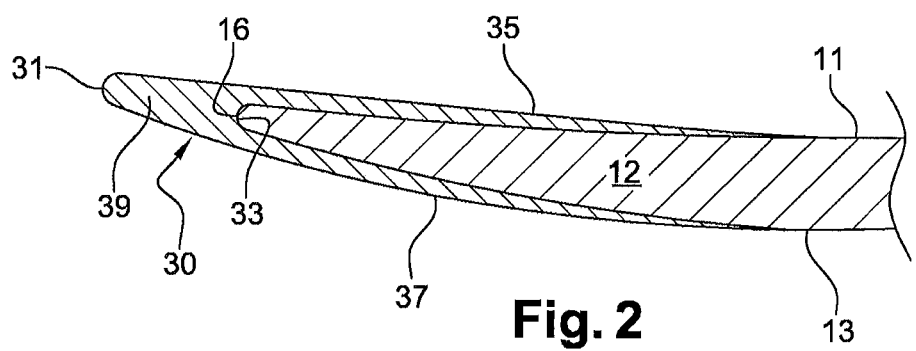

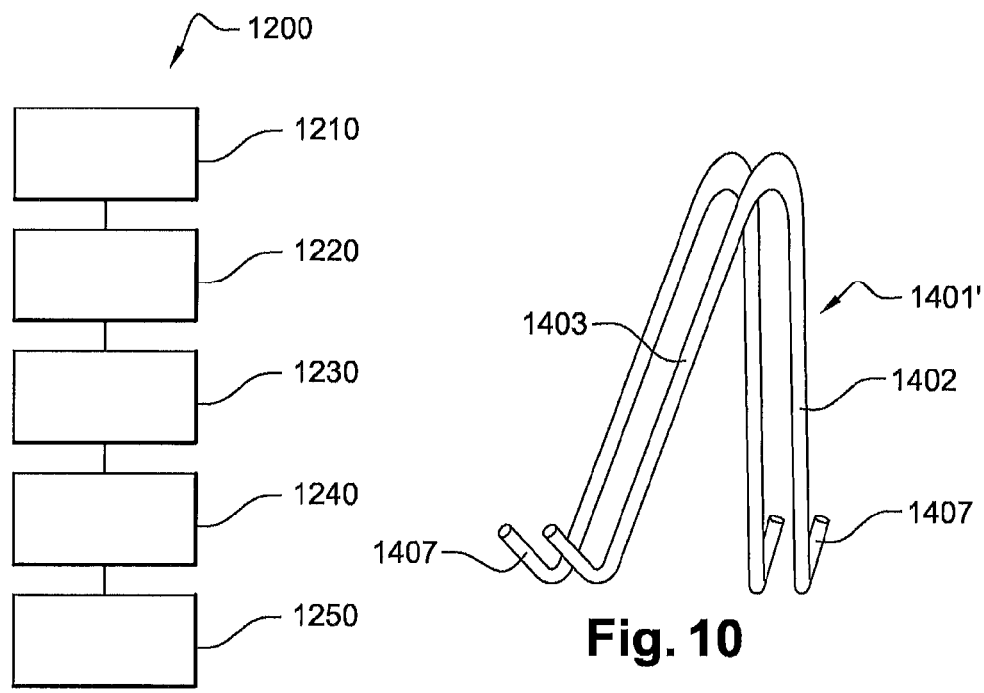
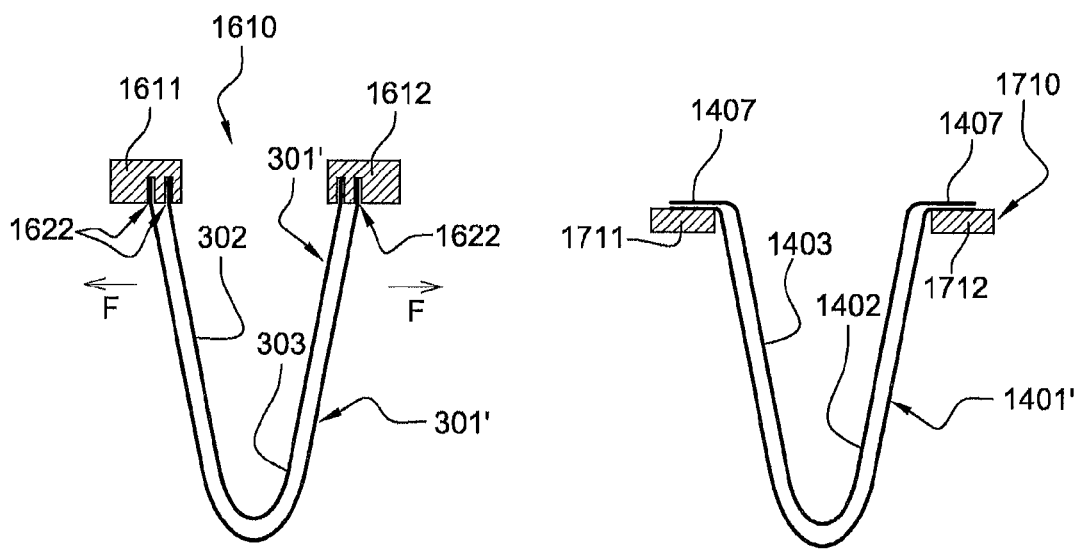

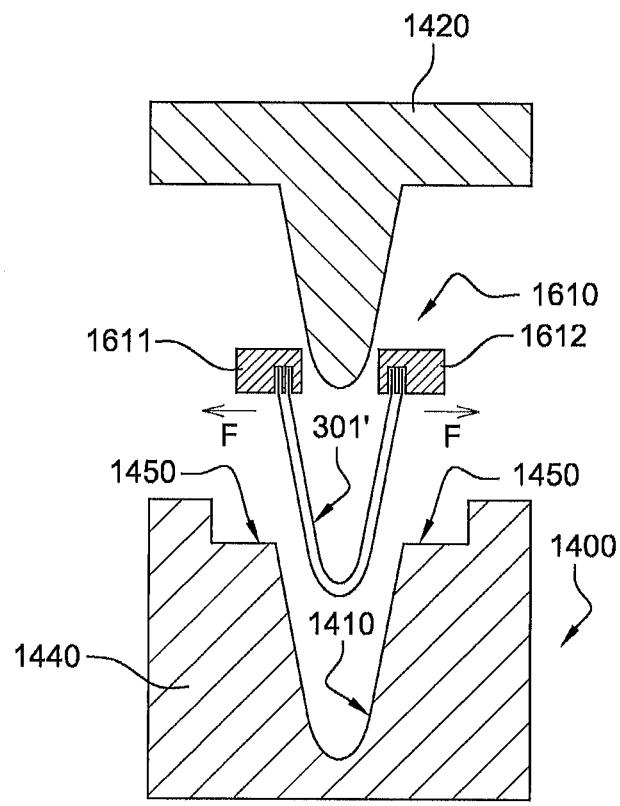
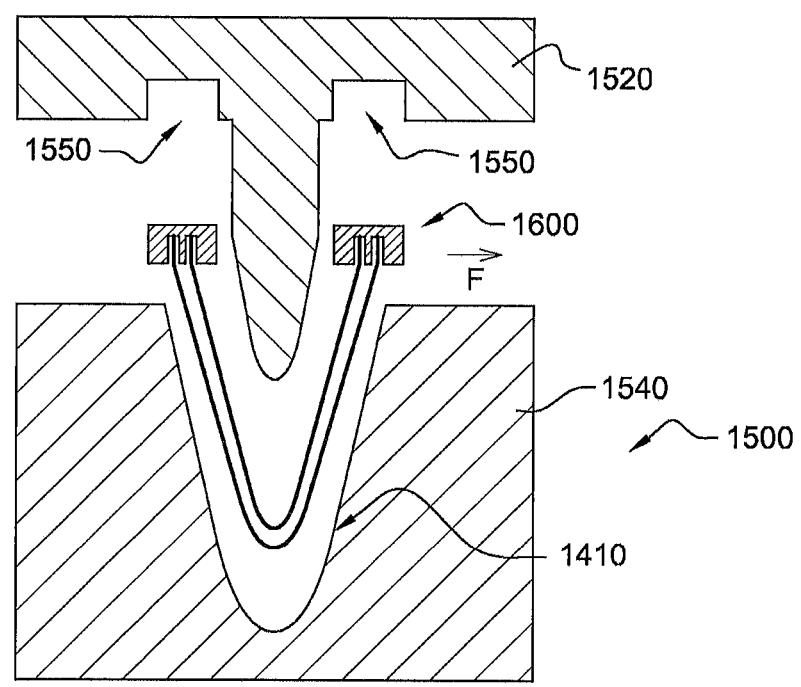
Fig. 13
Fig. 14

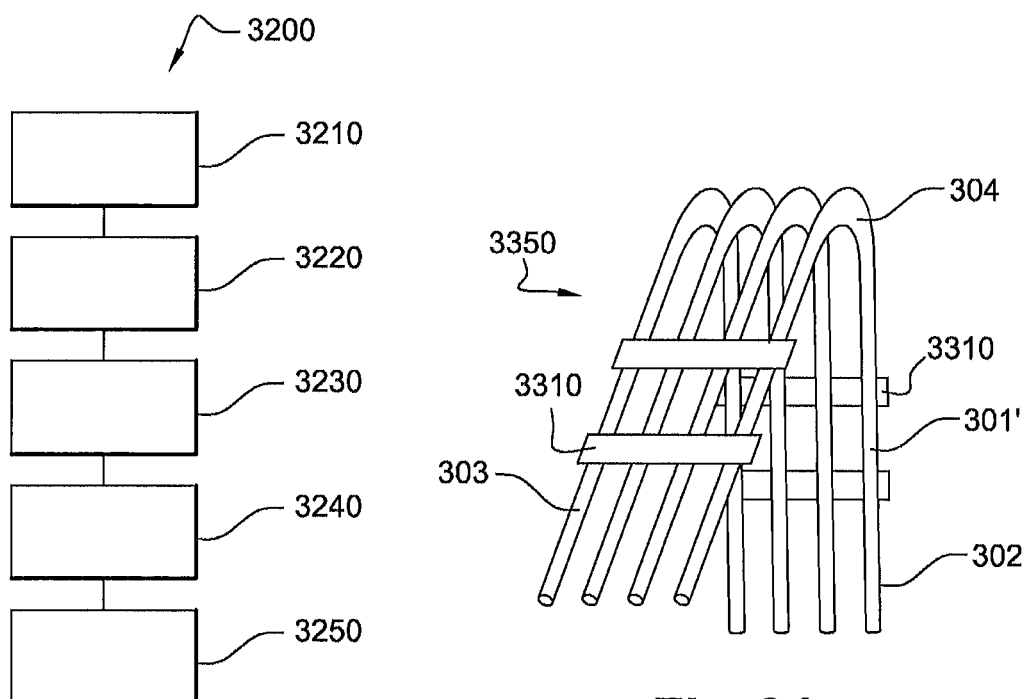
Fig. 23
Fig. 24
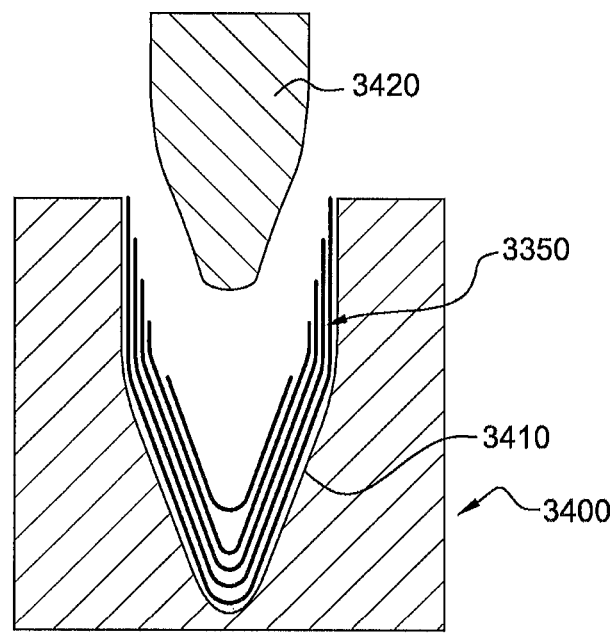
Fig. 25

PROCESS FOR MANUFACTURING A METAL PART, SUCH AS TURBINE ENGINE BLADE REINFORCEMENT

CROSS-REFERENCE TO RELATED APPLICATIONS

This is the U.S. National Stage of PCT/FR2012/050423, filed Feb. 29, 2012, which in turn claims priority to French Patent Application No. 1151656, filed Mar. 1, 2011, French Patent Application No. 1151658, filed Mar. 1, 2011, French Patent Application No. 1151661, filed Mar. 1, 2011, and French Patent Application No, 1151662, filed Mar. 1, 2011, the entire contents of all applications are incorporated herein by reference in their entireties.

TECHNICAL FIELD

The present invention relates to a process for manufacturing a metal part such as a metal reinforcement for a composite or metal turbine engine blade.

More particularly the invention relates to a process for manufacturing a metal reinforcement for the leading edge or trailing edge of a blade of a turbine engine.

The field of the invention is that of turbine engines and more specifically that of fan blades in composite or metal material and of turbine engines with the leading edge including a metal structural reinforcement.

However, the invention is also applicable to the manufacture of a metal reinforcement intended to reinforce a blade leading edge or a trailing edge of any type of turbine engine, land or aeronautic, and notably a helicopter gas turbine engine or the turbojet of an aircraft, but also propellers such as non-repaired contra rotating double fan propellers or open rotor propellers.

The invention also applies to the completion of any geometrically complex metal block parts.

STATE OF THE ART

It is recalled that the leading edge corresponds to the front part of an aerodynamic outline which is opposite to an air flow and which divides the flow of air and a flow of air from the lower surface and a flow of air from the upper surface.

The trailing edge corresponds to the rear part of an aerodynamic outline where lower surface and upper surface flows meet.

The turbine engine blades and notably the fan blades, undergo significant mechanical constraints, particularly associated with rotation speed, and must meet strict weight and overall size conditions. Consequently, blades are used in composite materials which are lighter.

It is widely known that the fan blades of a turbine engine, which are made of composite materials, are reinforced by metal structures extend to the top of the blade and beyond that, their leading edge, as mentioned in document EP 1908919. Such reinforcement allows for the protection of the composite blading at the time of impact on the fan from a foreign body, by a bird, hail or even pebbles for example.

Specifically, the metal structured support protects the blade's leading edge by avoiding risks of delamination, fibre rupture or even damage by fibre/matrix debonding.

Classically, a turbine engine blade includes and aerodynamic surface extending, in accordance with a first direction, between a leading edge and a trailing edge and, in accordance with a second direction sensitively perpendicular to the first direction, between the bottom and top of the blade. The metal structural reinforcement conforms to the shape of the leading edge of the blade's aerodynamic surface and is extended in accordance with the first direction beyond the leading edge from the blade's aerodynamic surface to conform to the blade's upper and lower surface outline and with the second direction between the bottom and top of the blade.

It is known that the metal structural reinforcement is a metal part in titanium manufactured entirely by milling from a block of material.

However, the metal reinforcement of a leading edge of a blade is a complex part to manufacture, requiring numerous requiring numerous re-work operations and complex tooling which involves high manufacturing costs.

It is also known that metal parts are manufactured, and notably metal structural reinforcement of turbine engine blade, from a three dimensional metal fibrous structure completed by weaving of metal wire and a hot isostatic pressing process in a tool causing the agglomeration of the metal wires of the metal fibrous structure so as to obtain a block part and this process is described in the application for a patent FR0858098.

Classically, the weaving of the fibrous structure is made by means of a plurality of metal warp threads and metal weft threads whose thickness if limited to a diameter in the order of some tenths of millimeters, typically between 0.1 mm and 0.3 mm.

The fibrous structure thus obtained by weaving is a plane and relatively rigid structure needed to be deformed to obtain a pre-formed fibrous structure to enable its introduction into the forming tool.

In order to compensate for this deformation step by a bending machine at the rear of the weaving of the fibrous structure and consequently limiting the dimensions of the fibrous structure, a manufacturing process of one metal fibrous structure by subsequent weaving of metal staples, re-shaped or bended to form a part sensitively in the shape of a U or a V, to serve the purpose of weft thread, was developed. In this process, described in the application for patent FR1058237, the weaving is achieved by the introduction of each of the arms of metal staples in at least one shed formed by two metal warp threads.

However, the weaving of metal staples formed by bended metal wires needs for a specific weaving profession to be used capable of shaping two sheds at the same time as for the passing of each of the arms of the staples.

GENERAL DESCRIPTION OF THE INVENTION

In this context, the invention aims to resolve the aforementioned problems by proposing a process for manufacturing a metal reinforcement for leading edge or trailing edge of a turbine engine blade enabling a significant reduction in costs as regards the manufacture of such a part and simplifying the manufacturing operation.

For this purpose, the invention proposes a process for manufacturing a metal part, such as a turbine engine blade metal reinforcement, successively including:
  a step for positioning many metal staples in forming tool presenting a die and a punch, said metal staples being of metal sections bended into U-shape or V-shape;
  a step of hot isostatic pressing of the said plurality metal staples causing the agglomeration of the said metal staples so as to obtain a compact metal part.

A staple is understood to be a metal part curved or bent in a way to form for example a part sensitively in the form of a U-shape or a V-shape.

Thanks to the invention, the metal part, such as a metal structured reinforcement for example including two curves according to two different planes (or a twisting around an axis), is achieved simply and rapidly from a plurality of metal staples, obtained by a simple operation of the forming of metal sections, such as metal wires, and a Hot Isostatic Pressing (HIP) or compressing process allowing for the obtaining of a compact part and without porosity by combining plastic deformation, creep and diffusion welding.

The metal staples are advantageously formed by the bending of the metal sections from a die whose cross section could indifferently be of circular, squared or hexagonal section, etc.

The metal staples thus prepared are easily positioned in the forming tool and thus enable the achievement of complex geometrical parts such as blade reinforcement.

This manufacturing process thus overcomes the need for the complex manufacture of a blade reinforcement using milling or broaching-type bulk machining from flats which requires the use of large volumes of materials and consequently high raw material supply costs. The process also allows metal reinforcements to be easily made which meet strict mass and/or geometric requirements.

Advantageously the metal part is a metal reinforcement of the leading edge or trailing edge of the fan blade of a turbine engine.

The process for manufacturing a metal part according to the invention can also present one or several of the following characteristics, considered individually or in accordance with all combinations technically possible:

- the said process is a process for manufacturing a metal reinforcement for a leading edge, or trailing edge, of a turbine engine blade, or a metal reinforcement for a propeller of the kind that the said metal part obtained at the time of the said isostatic pressure step is a metal reinforcement;
- the said step of the positioning the said plurality of staples is achieved by placing the staples, staple by staple, in the die on the said forming tool;
- the said step of the positioning the said plurality of staples is achieved by placing the staples, staple by staple, in the punch on the said forming tool;
- the said step of the positioning of the said plurality of staples is achieved by recessing of the arms of the said staples in holes in the said punch, the said housing being achieved by elastic deformation of the said arms;
- the said step of the positioning of the said plurality of staples includes a first sub-step of pre-positioning of the staples, staple by staple, on a moulded template and a second sub-step of the positioning of the said plurality of staples, pre-positioned on the said moulded template, in the said forming tool;
- the step for positioning the said plurality of staples includes a first sub-step for pre-positioning of the said plurality of metal staples on a detachable frame, so that the said staples are suspended in the said detachable frame and a second sub-step of positioning from the detachable frame, including the said plurality of staples in a housing well arranged in the forming tool;
- the said detachable frame is shaped by two rails so that at the time of the second sub-step for the positioning of the said detachable frame, with each of the said rails of the said detachable frame being capable of being inserted into a notch well arranged in the said forming tool, said notches forming the said housing of the said forming tool.
- The said notches are well arranged in the die of the said forming tool so that the said detachable frame is positioned in the said die during the said positioning step.
- The said notches are well arranged in the punch of the said forming tool so that the said detachable frame is positioned in the said punch during the said positioning step;
- The said first positioning step sub-step of the said plurality of staples including two arms is achieved by clamping of each of the said arms in the said housing hole well arranged in the said detachable frame, the said housing being achieved by elastic deformation of the said arms;
- The said first positioning sub-step of the said plurality of staples, including two arms presenting a retaining section at their free end, is achieved so that each staple is suspended on the said detachable frame by the said retaining sections;
- The said first positioning sub-step of the said plurality of staples is achieved staple by staple;
- The said positioning sub-step of the said plurality of staples is achieved by packets of staples previously assembled in the metal structure;
- The said positioning step of the said plurality of staples includes a first sub-step for manufacturing a metal structure formed by the assembly of one plurality of metal staples presenting a crossing hole and by at least one metal wire introduced in the said hole of each of the said metal staples of the said plurality and by a second positioning sub-step of the said metal structure in the forming tool;
- The said process includes a step for manufacturing the said crossing hole of each of the metal staples;
- The said crossing hole is achieved by laser drilling methods, during the said step for manufacturing the said crossing hole;
- The said metal structure is positioned in the said die of the forming tool;
- The said metal structure is positioned on the said punch of the forming tool;
- The said metal wire, introduced into the said crossing holes of the said metal staples, and/or the said metal staples are the titanium based metal wires and/or titanium and silicon carbide based wires, and/or boron coated silicon carbide based wires;
- The said metal structures is formed by the assembly of a plurality of metal staples where each metal staples has a geometry adapted to the shape of the metal part to be manufactured;
- The step for positioning of the said plurality of staples includes a first sub-step for manufacturing a multiplicity of three dimensional metal structures by fixing of a plurality of metal staples, each of the said three dimensional structures forming a portion of a preform of the said metal part to be achieved and a second positioning sub-step of the said multiplicity of three dimensional metal structures in the forming tool;
- The said sub-step for manufacturing the plurality of three dimensional structures is achieved by welding or by the laminating of a multiplicity of metal staples;
- The said sub-step for manufacturing a plurality of three dimensional metal structures is achieved by welding or the lamination of metal foil on the said metal staples forming a three dimensional metal structure, said metal foil linking each metal staple of a three dimensional metal structure;
- The said sub-step for manufacturing a plurality of three dimensional metal structures is achievement by welding or the lamination of at least each one metal wire on to the said metal staples forming a three dimensional metal structure, said at least one metal wire linking each metal staple of a three dimensional structure;

Each of the said staples includes a first and second arm, said welding or said lamination of said metal foil or said at least one metal wire being achieved on each first arm of each of the said metal staples and/or on second arm of each of the said metal staples;

The said staples and/or the said at least one metal wire are formed by titanium based metal wires and/or titanium coated silicon carbide based composite wires, and/or boron coated silicon carbide based wires;

The said sub-step for the positioning of the said plurality of metal structures is achieved by the placing of the said plurality of metal structures on to the die in the said forming tool;

The said sub-step for the positioning of the said plurality of metal structures is achieved by the placing of the said plurality of metal structures on to the punch in the said forming tool;

The said sub-step for the positioning of the said plurality of metal structures is achieved by the clamping of the arms of said metal staples in the clamping means arranged in the said punch, the said clamping being achieved by the elastic deformation of the said arms of the metal staples;

The said sub-step for the positioning of the said plurality of metal structures is achieved by the clamping of the arms of said metal staples in clamping means arranged in two rails forming a frame, the said clamping being achieved by the elastic deformation of the said arms of metal staples, the said frame being placed in a groove arranged in the said punch;

The said process includes a step for making said metal staples by bending of metal sections in a rectilinear shape;

The said metal staples are bended into a U and/or V shape during the bending step;

Prior to the said bending step the said process includes a step for the cutting of a multiplicity of metal sections;

The said metal part includes staples formed by titanium based metal wires and/or silicon-carbide-titanium (SiC-Ti) wires and/or boron silicon-carbide wires and staples formed by wires in silicon carbide (SiC).

The metal staples presenting a crossing hole can be thus one or another easily assembled by the threading of at least on metal wire inside each hole in the plurality of staples so as to achieve a supple metal structure (i.e. manually deformable in opposition to a deformation needing mechanical or hydraulic methods . . . ) in the form of a string or even a collar of metal staples. The metal structure is thus formed by metal staples suspended in metal wires.

The metal structure thus made is then easily transportable and can be positioned in forming tool including a complex shape, such as turbine engine blade metal reinforcement machinery including two curves according to the two separate inclines, with the supple metal structure being able to adapt itself to any kind of machinery curve.

In addition such a process can enable the forming of parts presenting shapes that cannot be developed, or even parts presenting enveloping shapes such as, for example, covering the ends of a blade in part.

BRIEF DESCRIPTION OF THE DRAWINGS

Other characteristics and advantages of the invention shall stand out more clearly from the description which is given below, indicatively and not in the least restrictive, in reference to the appended figures, among which:

FIG. 1 is a lateral view of a blade including a structural metal leading edge reinforcement obtained via the completion process according to the invention;

FIG. 2 is a partial section view of FIG. 1 according to an AA cut plan;

FIG. 9 is a synoptic picture presenting the main steps of a second method for achievement of a turbine engine blade leading edge metal structural reinforcement of the completion process according to the invention;

FIG. 10 illustrates a view of the turbine engine blade leading edge metal reinforcement according to a second example of achievement of the second step of the second method for completion of the process illustrated in FIG. 9;

FIG. 11 illustrates a section view of the turbine engine blade leading edge metal reinforcement according to the first completion model described in FIG. 5 of the third step of the second method of achievement of the process illustrated in FIG. 9;

FIG. 12 illustrates a section view of the turbine engine blade leading edge metal reinforcement according to the second completion model described in FIG. 10 of the third step of the second method for manufacturing the process illustrated in FIG. 9;

FIG. 13 illustrates a section view of the turbine engine blade leading edge metal reinforcement according to a first model for achievement of the fourth step of the second method for achievement of the process illustrated in FIG. 9;

FIG. 14 illustrates a section view of the turbine engine blade leading edge metal reinforcement according to a second model for achievement of the fourth step of the second method for achievement of the process illustrated in FIG. 9;

FIG. 23 is a synoptic picture presenting the main steps of a fourth method for manufacturing a turbine engine blade leading edge metal structural reinforcement of the completion process according to invention;

FIG. 24 illustrates a section view of the turbine engine blade leading edge metal reinforcement during the third step of the fourth method of achievement of the process illustrated in FIG. 23;

FIG. 25 illustrates a section view of the turbine engine blade leading edge metal reinforcement according to a first example of achievement of the fourth step of the fourth method of achievement of the process illustrated in FIG. 23;

In all figures, the common items bear the same reference numbers except if specified to the contrary.

DETAILED DESCRIPTION OF A FIRST COMPLETION METHOD

Figure 3:
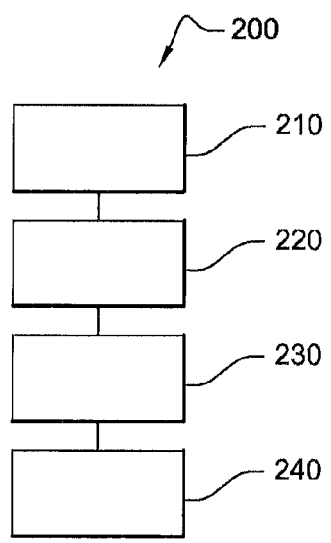
FIG. 3 is a synoptic picture presenting the main steps of a first method of achievement of a turbine engine blade leading edge metal structural reinforcement.

FIG. 1 is a lateral view of a blade which includes a leading edge metal structural reinforcement obtained by way of the completion process according to the invention.

The blade 10 illustrated is a mobile fan blade of a turbine engine (not represented). The blade 10 includes an aerodynamic surface 12 extending according to a first axial direction 14 between a leading edge 16 and a trailing edge 18 and according to a second radial direction 20 sensitively perpendicular to the first direction 14 between a foot 22 and a peak 24.

The aerodynamic surface 12 forms the upper surface side 13 and the lower surface 11 of the blade 10 with only the upper surface side 13 of the blade 10 being represented in FIG. 1. The lower surface 11 and the upper surface 13 form the lateral sides of the blade 10 which link the leading edge 16 to the trailing edge 18 of the blade 10.

In this method of completion, the blade 10 is a composite blade typically obtained by the formation of a woven fibrous texture. By way of example, the composite material used can be composed of an assembly of woven carbon fibres and a resinous die, all being formed by moulding in the RTM type resin injection process (for "Resin Transfer Moulding") or again VARTM (for Vacuum Resin Transfer Moulding). The blade 10 includes a metal structural support 30 stuck on leading edge 16 and which extends all at once according to the first direction 14 beyond the leading edge 16 of the aerodynamic surface 12 of the blade 10 and according to the second direction 20 between the foot 22 and the peak 24 of the blade.

As represented in FIG. 2, the structural reinforcement 30 conforms in shape to the leading edge 16 of the aerodynamic surface 12 and the blade 10 so that it is prolonged to form a leading edge 31, said leading edge of the reinforcement.

Classically, the structural reinforcement 30 is a single block part including a section sensitively in the shape of a V presenting a base 39 forming the leading edge 31 and is prolonged by two lateral sides 35 and 37 conforming in shape to the lower surface 11 and upper surface 13 of the aerodynamic surface 12 of the blade respectively. The sides 35, 37 present a thinned down or tapered outline in direction of the blade's trailing edge.

The base 39 includes an internal outline 33 rounded for conforming in shape to the rounded shape of the leading edge 16 of the blade 10, The structural reinforcement 30 is metal and preferably titanium based. This material indeed has a large shock energy absorption capacity. The reinforcement is bonded on to the blade 10 by means of a bonding agent known by the man in the art, such as epoxy glue for example.

This type of metal structural reinforcement 30 used to reinforce the turbine engine composite blade reinforcement is more specifically described in the application for patent EP1908919, The process, according to the invention, in particular allows for a structural reinforcement such as is illustrated in FIG. 2 to be achieved, FIG. 2 illustrating the reinforcement 30 in its final state.

FIG. 3 represents a synoptic picture illustrating the main process achievement steps 200 for a metal part enabling the achievement of a blade 10 leading edge metal structural reinforcement 30 such as illustrated in FIGS. 1 and 2.

Figure 4:
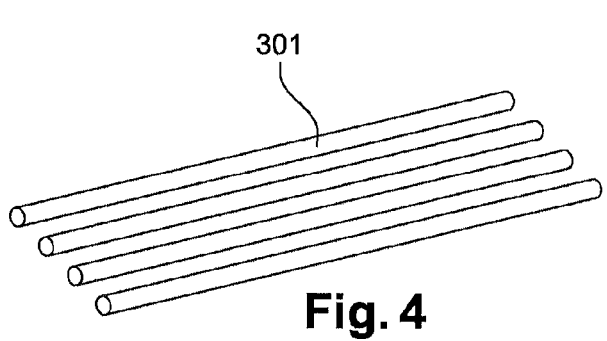
FIG. 4 illustrates a view of the turbine engine blade leading edge metal reinforcement during the first step of the process illustrated in FIG. 3.

The first step 210 of the completion process 200 is a step cutting a multiplicity of metal sections 301 from a continuous metal wire for example from a network, where each section length 301 is determined according to the final part to be achieved. The metal sections 301 thus cut are illustrated in FIG. 4.

Each metal section 301 can therefore have a specific length according to the part of metal reinforcement 30 that it represents and the length of overlapping of the sides 35, 37 of reinforcement 30 varying according to the second direction 20 between the foot 22 and the peak 24 of the blade.

The diameter of the metal sections 301 can vary according to the user's needs, and the thickness of the material necessary for manufacturing the part. The determination of the diameter of the sections is achieved in accordance working on a compromise between material suppleness and thickness necessary in the machinery.

The metal section is typically formed from a metal wire of circular section but can just as well be formed from a metal section which is squared, rectangular or hexagonal, etc.

Figure 5:
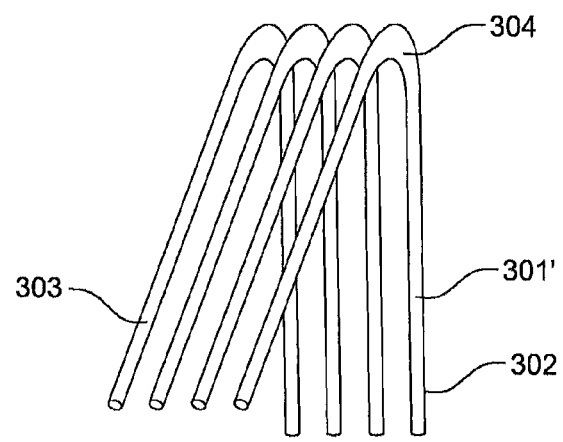
FIG. 5 illustrates a view of the turbine engine blade leading edge metal reinforcement during the second step of the process illustrated in FIG. 3.

The second step 220 of the manufacturing process 200 is a cold forming step or the forming of metal sections 301 cut at the time of the first step 210. This second step is illustrated in FIG. 5.

This second step enables the cold forming (i.e. at ambient temperature) of each metal section 301 rectilinear by plastic deformation so as to obtain a preformed metal section 301', named staple consequently, whose geometry is determined according to the final part to be achieved and in particular according to the shape of the compacting machinery to be used for manufacturing the final part.

The staples 301' are achieved by deformation of the metal rectilinear sections 301 by means of simple machinery that is possible to work manually, with the individual deformation of each section not needing hydraulic methods for the consequent achievement of deformation. Advantageously, the deformation machinery is a classic deformation tool which can be automated and calibrated as much for the final form of the metal staples 301' as for the pressure force according to the user's needs.

Thus the staples 301' can be formed individually or by group from a plurality of metal sections 301.

The step 220 for deformation of sections thus enables the passing from one metal rectilinear section 301 to a preformed metal section 301' in the shape of a staple, including two sensitively rectilinear arms 302 and 303 joined to one another by a connecting element 304 which has undergone at least one deformation. The lengths of the arms 302 and 303 can be different for the same staple. The metal section 301 can thus be entirely or partially crushed (for example to restrict local thickness).

In association with the achievement of a turbine engine blade metal reinforcement, the staples 301' are favourably in the shape of a U or a V.

The third step 230 of the completion process 200 is a step for positioning a plurality of staples 301' in the forming tool.

The machinery 400 includes an indentation 410 (die) corresponding to the final external shape of the metal reinforcement 30 and a counter-indentation 420, 520 (punch) corresponding to the final internal shape of the leading edge metal reinforcement.

Figure 6:
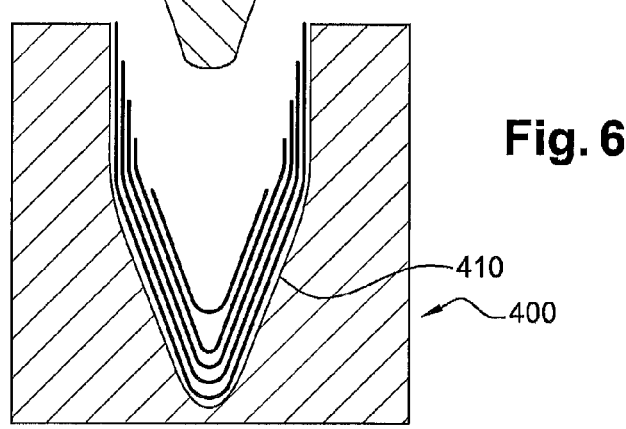
FIG. 6 illustrates a section view of the turbine engine blade leading edge metal reinforcement according to a first model for achievement of the third step of the first method for achievement of the process illustrated in FIG. 3.

According to a first step of completion illustrated in FIG. 6, the positioning step 230 is achieved by the positioning of the staples 301' in the indentation 410 of the forming tool 400. The positioning is achieved staple by staple throughout the length of the indentation 410. The spacing between the different staples 301' (i.e. the thread) is defined according to the thickness of the staple 301' and the needs of the material for the part to be achieved.

With the staples 301' including the additional shape of the indentation 410, the positioning is completed easily and can therefore obtain a metal material deposit conforming to the complex shape of the indentation 410 including two curves according to two separate inclines.

During this positioning step 230, several layers of staples 301' as is illustrated in FIG. 6, can be superimposed so as to respect the thicknesses of material necessary to complete the part. Specifically, the thickness of the part is not necessarily constant: the layout and the number of staples can then vary along the part to adapt to these variations in thickness.

Of course, the shape of the stapes 301' and the length of the arms 302, 303 of the different layers can also be adjusted according to the needs of material necessary for manufacturing the metal reinforcement 30.

So as to improve the maintenance of the staples positioned in the indentation, the staples can advantageously include two shoulders achieved at the time of the cold forming step 220 on each free end of the staples for the shaping of a V or a U. The shoulders are achieved by the bending of one part of the end of each arm so as to achieve two parts to form supports aiding the positioning of the staples and their maintenance in the indentation.

In accordance with a completion variant, the ends capable of forming the shoulders can also be deformed so that the shoulders have the shape of planes including at least one plane surface capable of being a support on the indentation. . For this purpose, the forming tool is well arranged so as to offer the indentation a detachment enabling the staples to take support in the indentation. In addition, the forming tool's punch has two shoulders, on each side of the punch's V shape, capable of positioning themselves in the detachments well arranged in the indentation at the time that the machinery is shut down.

Figure 7:
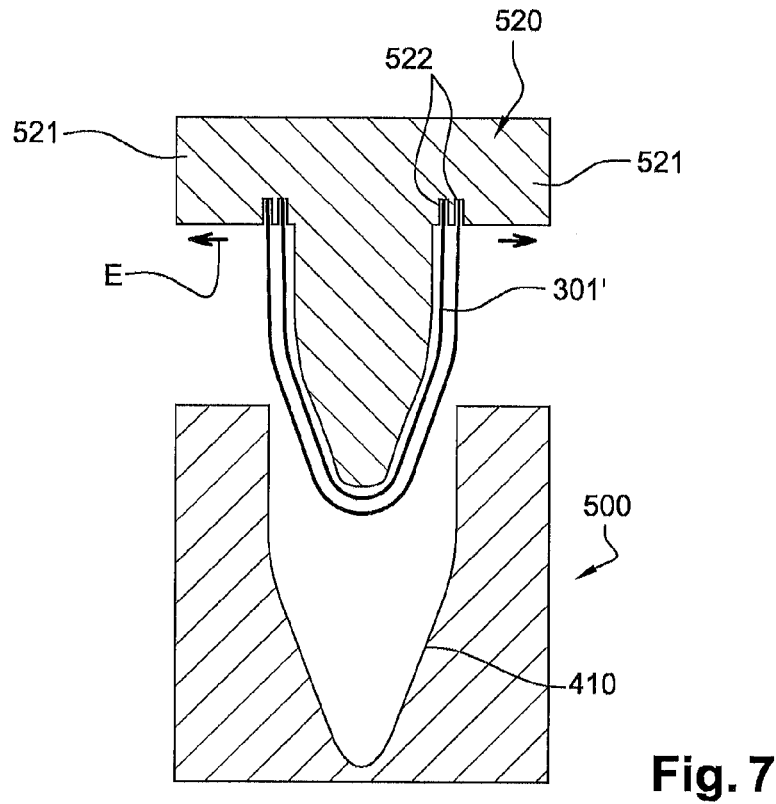
FIG. 7 illustrates a section view of the turbine engine blade leading edge metal reinforcement according to a second example for achievement of the third step of the first method for achievement of the process illustrated in FIG. 3.

According to a second example of completion illustrated in FIG. 7, the positioning step 230 is achieved by positioning of staples 301' on the punch 520 of the forming tool 500.

For this purpose, the forming tool 500 includes an indentation 410 (die) similar to the first example of completion and a counter indentation 520 (punch) corresponding to the final internal shape of the leading edge metal reinforcement and including two shoulders 521 in its upper part on each side of the V shape corresponding to the final internal shape of the metal reinforcement. The side of the shoulders 521, as regards the inside of the machinery, includes a multiplicity of holes 522, distributed over the entire length of the punch 520, capable of receiving the ends of the arms 302, 303 of the staples 301'. Thus, according to this second example of completion, the positioning of the staples 301' on the punch 520 is achieved staple by staple with the indentation of arms 302, 303 in the holes 522 situated on each side of the V shape of the punch 520. The keeping of the staples 301' in position is achieved owing to the elastic property of the arms 302, 303 exerting a pressure on the sides of the holes 522 by elastic return.

Advantageously and to guarantee good maintenance of the staples in position, the shaping of the staples in the second step is achieved so as to obtain the staples whose gap in rest position (i.e. without external restriction) between the two arms 302, 303 is larger or smaller than the gap between two holes 522 located on each side of the V shape of the punch 520.

Thus, when the gap of the arms 302, 303 in rest position is greater than the gap of two holes 522, the staples 301' are kept indented by elastic return of the arms 302, 303 which exert an elastic stress, in accordance with the direction illustrated by arrows referenced E, to find their position of rest.

Inversely, when the gap of the arms 302, 303 in position of rest is lower than the gap of the two holes 522, the staples 301' are kept indented by elastic return of the arms 302, 303 which exert an elastic stress, according to the direction opposite to the direction illustrated by arrows referenced E, to find their position of rest.

In a similar way to the first completion model illustrated previously, the spacing (i.e. the thread) between the different staples 301' is defined according to the thickness of the staple 301' and the needs as regards the material for the part to be achieved.

Several layers of staples, as is illustrated in FIG. 7, can be superimposed so as to respect the thickness of the material necessary for manufacturing the part. The shape of the staples 301' and the length of the arms 302, 303 of the different layers can also be adjusted according to the needs of the material necessary for manufacturing the metal reinforcement 30.

According to a third completion example, the positioning step 230 can include a sub-step for pre-positioning of the plurality of staples, staple by staple, on a moulding template with all staples being then positioned in a forming tool 400, 500 either in the indentation 410 or on to the punch 520 as described previously.

The metal sections 301 allowing the completion of the staples 301' are mainly of titanium based wires. However it is possible to incorporate boron coated wires (SiC-Boron wire) or even silicon carbide wires (SiC-SiC wire) among the staples in titanium of metal staples with a silicon carbide and titanium (SiC-Ti) base to the extent where the curving radius of the sections 301 authorises the deformation of these "composite" wires without breaking them. The metal sections 301 have a responsive thickness varying between 0.1 mm and 5 mm.

The step 230 for the positioning of the staples 301' can also include as sub insertion step for an insert between two successive layers of staples 301' so as to supply, for example, an oversize of local material and then consequently, a specific reinforcement achieved in a material or again to achieve a hollow metal reinforcement.

By way of example, the insert can be a block insert achieved by forging, machining or by casting where an insert is woven with metal wires for example with titanium wires and/or titanium and silicon carbide (SiC-Ti) based wires and/or boron coated wires (SiC-Boron) or again silicon carbide (SiC-SiC) wires. Whatever kind of material used to achieve the insert inserted between the different layers of staples, it is necessary that this material is compatible with the kind of material used for manufacturing metal staples 301' and presents the properties allowing for superplastic forming and diffusion welding.

For manufacturing a hollow metal reinforcement (not represented), the insert is a fugitive insert achieved in a material different from the material used to achieve the metal staples 301'.

"Fugitive insert" means an insert that is not intended to be permanent and which is only necessary for manufacturing the leading edge hollow metal reinforcement. The fugitive insert is therefore not present in the metal reinforcement in its final state and does not participate in any of the mechanical characteristics of the metal reinforcement.

The fugitive insert is for example achieved in a material capable of resisting a high temperature of 900° C. and a high pressure of 1000 bar, and is compatible with metal staple 301' material so as not to create impurities or oxidation.

The material of the fugitive insert must also be able to be attacked chemically by chemical agent dissolution.

The fugitive insert is best achieved in copper, quartz or in silicon.

The shape of the fugitive insert incorporated in the piling up of the layers of staples 301' is dependent on the shape of the desired final internal cavity.

Figure 8:
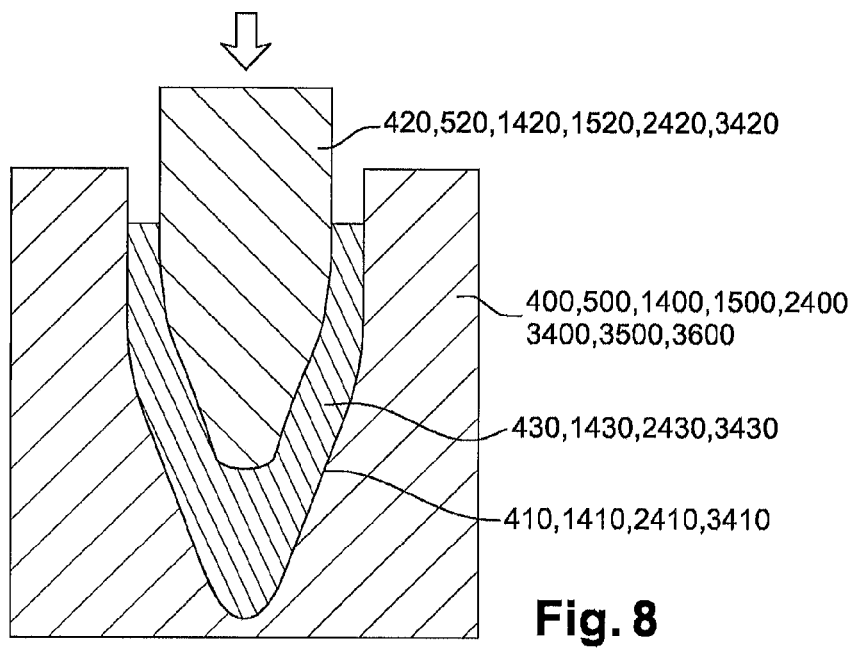
FIG. 8 illustrates a section view of the turbine engine blade leading edge metal reinforcement during the isostatic pressing step for the different methods of achievement of the process according to the invention in FIGS. 3, 9, 15 and 23.

The fourth step 240 of the completion process 200, illustrated in FIG. 8, is a hot isostatic pressing step (HIP for Hot Isostatic Pressing in English) of the piling up of the different layers of staples positioned in the machinery 400, 500.

The hot isostatic pressing is a well-used manufacturing process and well known for reducing the porosity of metals and influencing the thickness of numerous metals in the form of pre-compacted powder, for example. The isostatic pressing process in addition enables the improvement of mechanical properties and the workability of materials.

Isostatic pressing is achieved at high temperature (classically between 400° C. and 1400° C. and 1000° C. for titanium) and at isostatic pressure.

Thus, the application of the heat combined with the internal pressure eliminates the empty spaces in the piling up as well as micro-porosities by means of a combination of plastic deformation, creep and diffusion welding so as to form a block part 430.

The block part 430 from the isostatic pressing step includes the internal and external outlines of the metal reinforcement 30. The block part 430 is then removed by machinery 400.

The isostatic pressing step is achieved under vacuum, advantageously under a secondary vacuum either in welded machinery in which the secondary vacuum is achieved, or in an autoclave bag with the choice of process dependent on the number of parts to be produced. The secondary vacuum enables the avoiding of the presence of oxygen molecules in the machinery and in the fibrous structure during the isostatic pressing phase for titanium.

The machinery 400, 500 is achieved in a mechanical alloy known as superalloy or high performance alloy.

The isostatic pressing step 240 can previously include a cleaning, degreasing step and/or chemical attack of the metal staples 301' so as to remove residual impurities from the different layers of staples.

The impurities cleaning step is best achieved by the soaking of all staples positioned in the machinery in a bath with cleaning or chemical agent.

In association with the manufacturing of a hollow metal reinforcement, the process according to the invention can include an extra insert chemical attack phase, introduced between the different layers of staples 301' and as an integral part of the block part 430 compacted. The chemical attack is achieved by means of a chemical agent capable of attacking the material in which the insert is achieved. The chemical attack of the fugitive insert enables the dissolving of the fugitive insert so that the space released by the dissolved insert forms the internal cavity of the hollow metal reinforcement. The chemical attack phase is favourably achieved by soaking of the block part 430 in a bath including the chemical agent capable of dissolving the insert. The chemical agent is an acid for example or a base.

Fortunately the chemical agent is capable of dissolving the copper, the quartz or even the silicon.

Detailed Description of a Second Completion Method

FIG. 9 is a synoptic picture illustrating the main steps of the second method of completion of the completion process 1200 for a metal part enabling the achievement of a blade 10 leading edge metal structural reinforcement 30 for example, as is illustrated in FIGS. 1 and 2.

In this second completion method, the first step 1210 of the completion process 1200 is a step for cutting a multiplicity of metal sections 301 from a continuous metal wire from a network for example, where each section 301 length is determined according to the final part to be achieved. The metal sections 301 thus cut are illustrated in FIG. 4.

Each metal section 301 can therefore have a specific length according to the part of the metal reinforcement 30 that it represents the length for overlapping the sides 35, 37 of the reinforcement 30 varying according to the different direction 20 between the foot 22 and the peak 24 of the blade.

The diameter of the metal sections 301 can vary according to the user's needs and the thickness of the material necessary to achieve the part. Determining the diameter of the sections is achieved in accordance working on a compromise between suppleness and the thickness of the material necessary in the machinery.

The metal section is typically formed from a metal wire of circular section but can also be formed from a metal profile of squared, rectangular, hexagonal, etc. section.

The second step 1220 of the manufacturing process 1200 is a cold forming step or forming of the metal sections 301 cut during the first step 1210. This second step is illustrated in FIG. 5.

This second step 1220 enables the cold forming (i.e. at ambient temperature) of each rectilinear metal section 301 by plastic deformation. This step therefore enables the obtaining of a pre-formed metal section 301', known as the follow on staple whose geometry is determined according to the final part to be completed and particularly according to the shape of the compacting machine used to achieve the final part.

The staples 301' are achieved by deformation of the rectilinear metal sections 301 by means of a single tool that can be used manually with the individual deformation of each section not needing the hydraulic methods for the consequent achievement of the deformation of the metal section 301. Fortunately, the deformation machinery is a classic deformation tool that can be automated and calibrated as much in the final forming of the metal staples 301' as the pressure strength according to the user's needs.

Thus the staples 301' can be shaped individually or by packet composed of a multiplicity of metal sections 301.

The deformation step 1220 thus enables the passing of one rectilinear metal section 301 to a preformed metal section 301' forming a staple 301', including two sensitively rectilinear arms 302 and 303 joined together at each end by a joining element 304 having undergone at least one deformation. The lengths of the arms 302 and 303 can be different for the same staple 301'. The metal section 301 can be thus entirely or partially crushed (for example for a local thickness restriction) during the deformation step.

In completing a turbine engine blade metal reinforcement, the staples 301' are best in a U or V shape.

According to a completion variant, the cold forming step 1220 includes an extra operation consisting of forming ends 1404, 1406 of the arms 1402, 1403 of the staples 1401' so as to create staples 1401' with shoulders 1407 at their free ends as is illustrated in FIG. 10.

The third step 1230 of the completion process 1200 is a step for the positioning of a plurality of staples 301' on a frame 1610 formed by two rails 1611 and 1612 illustrated in FIGS. 11 and 12. The shape of the rails 1611, 1711 and 1612, 1712 keeps to the neutral fibre of the part to be completed such as, for example, the complex neutral fibre of the blade reinforcement.

The positioning of the plurality of staples 301', 1401' is achieved staple by staple or still by packets of staples previously positioned and maintained as solid by interlocking methods. By way of example, the staples 301', 401' are maintained in bundles, so as to form a three dimensional metal structure, by welding or even by laminating, of metal bands, known as metal foils cut previously in thin metal leaf.

The space between each staple 301', 1401' (i.e. the thread) is defined according to the thickness of the staple 301', 401' and the needs of the material so that the part can be achieved.

According to the first completion model illustrated in FIG. 11, the rails 1611 and 1612 of the frame 1610 including methods of housing 1622 such as holes, enabling the housed staples 301' to be kept in position by using the elastic property of the arms 302, 303 of the staples 301'. The staples 301' are then kept in position exerting pressure against the walls of the housing means 1622 by elastic return of the arms 302 and 303 previously deformed to enable their introduction into the housing holes 1622.

In an advantageous manner and to guarantee that the staples 301' are kept in a good position on the frame 1610, the shaping of the staples in the second step 1220 is achieved to, in a rest position (i.e. without external constraint), obtain a gap between the two arms 302, 303 of the staples 301' greater or less than the gap between the two housing methods 1622 situated on each of the rails 1611 and 1612 of the frame 1610.

Thus when the gap of the arms 302, 303 in position of rest is greater than the gap of the two housing holes 1622 located on each of the rails 1611 and 1612, the staples 301' are kept housed by the elastic return of the arms 302, 303 exerting a pressure force against the walls of the housing holes 1622, in accordance with a direction illustrated by the F referenced arrows, in order to find their rest position.

Contrary to this, when the gap of arms 302, 303 in rest position is less than the gap of the two housing holes 1622 situated on each of the rails 1611 and 1612, the staples 301' are kept housed by the elastic return of the arms 302, 303 exerting a pressure force against the walls of the housing holes 1622, in accordance with a direction illustrated by the F referenced arrows, in order to find their rest position.

In this third step 1230 of the completion process 1200, several layers of staples 301', such as those illustrated in FIG. 5, can be superimposed so as to respect the thickness of material necessary to achieve the part. For this purpose, rails 1611 and 1612 of the frame include several lines of housing holes 1622. On FIG. 11 representing a section of the frame 1610, two lines of housing holes 1622 are represented on each rail 1611 and 1612 of the frame 1610. The shape of the staples 301' from the different superimposed layers can also be dependent on the needs of the localised materials which are necessary for manufacturing the metal reinforcement 30. Of course the shape and length of the staples 301' from the different layers can also be adjusted according to the needs of the material necessary for manufacturing the metal reinforcement 30.

According to the second example of completion illustrated in FIG. 12, the staples 1401' are kept in position on the frame 1710 by the shoulders 1407 located on each end of the V or U shape of the staple 1401'. Thus, the two shoulders 1407 of the staple enable it to be kept suspended on the frame 1710 by taking support on each of the rails 1711, 1712 of the frame 1710.

According to this second completion model, several layers of staples 1401' can also be superimposed so as to respect the thicknesses of the material necessary to achieve the part.

The staples 301' and 1401' of the different layers are mainly achieved from titanium based metal wires. However it is also possible to incorporate titanium and silicon carbide (SiC-Ti) based metal staples with wires coated with boron (SiC-Boron wire) or again silicon carbide staples (SiC-SiC wire) among the staples 301', 1401' in titanium positioned on the frame 1610, 1710, to the extent where the curve radius of the staples authorises a deformation of these wires, known as "composite" wires without reaching their rupture limit.

The staples 301', 1401' are achieved from metal sections of a thickness responsively varying from 0.1 mm to 5 mm.

The step 1230 for positioning the staples 301', 1401' can also include a sub-step for the insertion of an insert between two successive layers of staples 301', 1401' so as to supply a local oversize more consequent of material for example, a specific reinforcement achieved in a different material or still to supply a hollow metal reinforcement.

By way of example, the insert can be a block insert achieved by forging, machining or casting, where an insert woven by metal wires for example with titanium wires and/or titanium and silicon carbide (SiC-Ti) aluminium (SIC-AI) based wires in the case of aluminium alloyed staples and/or Boron coated wires (SiC-Bore) or again Silicon Carbide (SiC-SiC). Whatever kind of material used for the completion of the insert inserted between the different layers of staples 301', 1401', it is necessary that this material is compatible with the kind of material used to achieve the metal staples 301', 1401' and presenting proprieties allowing for superplastic formation and diffusion welding.

For the completion of a hollow metal reinforcement (not represented), the insert is a fugitive insert achieved in a material different from the material used to achieve the metal staples 301', 1401'.

"Fugitive insert" means an insert that is not intended to be permanent and which is only necessary for manufacturing the leading edge hollow metal reinforcement. The fugitive insert is therefore not present in the metal reinforcement in its final state and does not participate in any of the mechanical characteristics of the metal reinforcement.

The fugitive insert is for example achieved in a material capable of resisting a high temperature of 900° C. and a high pressure of 1000 bar, and which is compatible with metal staple 301', 1401' material so as not to create impurities or oxidation.

The material of the fugitive insert must also be able to be attacked chemically by chemical agent dissolution.

Advantageously, the fugitive insert is achieved in copper, quartz or in silicon.

The shape of the fugitive insert incorporated in the piling up of the layers of staples 301', 1401' is dependent on the shape of the final internal cavity desired.

The fourth step 1240 of the completion process 1200 is a positioning step of frame 1610, 1710 including the multiplicity of staples 301', 1401' in the forming tool 1400, 1500.

The machinery 1400, 1500 includes a die 1440, 1540 with an indentation 1410 corresponding to the final external shape of the metal reinforcement 30 and a punch 1420, 1520 corresponding to the final internal shape of the metal leading edge reinforcement.

This step 1240 of the completion process 1200 is illustrated in FIGS. 13 and 14 with the frame 1610 contained in the first example of completion described in FIGS. 5 and 11. However this step is also applicable to the frame 1710 and to the staples 1401' in the second method of completion described in FIGS. 9 and 12.

According to a first completion variant illustrated in FIG. 13, the positioning of the frame 1610 is achieved in the die 1440 of the forming tool 1400.

For this purpose, the die 1440 of the forming tool 1400 has two notches 1450 in its upper part, situated on each end of the indentation 1410, forming housing capable of receiving the frame 1610.

The shape of the notches 1450 conforms to the shape of the frame 1610 so that the frame 1610 is placed in the notches 1450 simply by boxing.

The staples 301' including the additional shape of the indentation 1410, the positioning of the frame 1610 including the plurality of staples 301' are simply achieved and therefore can obtain a deposit of material conforming to the complex shape of the indentation 1410 including curves according to two separate inclines.

According to a second completion variant illustrated in FIG. 14, the positioning step 1240 is achieved by positioning the frame 1610 on to the punch 1520 of the forming tool 1500.

For this purpose, the forming tool 1500 has a die 1540 presenting an indentation 1410 similar to the first completion variant, and a punch 1520 corresponding to the final internal shape of the leading edge metal reinforcement. The punch 1520 has two notches 1550 in its upper part located at each end of the V shape corresponding to the metal reinforcement's final internal shape.

In a similar fashion to the previous completion variant, the notches 1550 form an accommodation able to receive the frame, 1610 in which the staples 301' are embedded. The shape of the notches 1550 also harmonises with the shape of the rails 1611, 1612 forming the frame 1610 so that the frame 1610 is set up in the notches 1550 simply by boxing.

In this completion variant, each of the rails 1611, 1612 of the frame 1610 is maintained in one of the notches 1550 of the punch 1520, for example by a cold joining by using measuring rods or not, by screwing methods or by other classical maintenance methods.

Similarly to the previous variant, with the staples 301' including the additional shape of the indentation 1410 of the die 1540, the frame 1610 is positioned easily and therefore enables the depositing of a metal material conforming to the punch's complex shape and includes two curves according to two separate inclines.

The fifth step 1250 of the completion process 1200, illustrated in FIG. 8 is a is a hot isostatic pressing step (HIP for Hot Isostatic Pressing in English) of the piling up of the different layers of staples 301', 1401' positioned in the machinery 1400, 1500.

The hot isostatic pressing is a well-used manufacturing process, well known for reducing the porosity of metals and influencing the thickness of numerous metals in the form of pre-compacted powder for example. The isostatic pressing process in addition enables an improvement in mechanical properties and the workability of materials.

Isostatic pressing is achieved at high temperature (classically between 400° C. and 1400° C. and 1000° C. for titanium) and at isostatic pressure.

Thus, the application of the heat combined with the internal pressure eliminates the empty spaces in the piling up as well as micro-porosities by means of a combination of plastic deformation, creep and diffusion welding so as to form a block part 1430.

The block part 1430 from the isostatic pressing step includes the internal and external outlines of the metal reinforcement 30. The block part 1430 is then removed from the machinery 1400, 1500.

The isostatic pressing step is achieved under vacuum, advantageously under a secondary vacuum either in welded machinery in which the secondary vacuum is achieved, or in an autoclave bag with the choice of process dependent on the number of parts to be produced. The secondary vacuum enables the avoiding of the presence of oxygen molecules in the machinery and in the fibrous structure during the titanium isostatic pressing phase.

In accordance with another completion method, the hot pressing can also be an isothermal forging process under press in an enclosure under vacuum.

The machinery 1400, 1500 is achieved in a mechanical alloy known as super alloy or high performance alloy.

The rails 1611, 1711 and 1612, 1712 of the frame 1610, 1710 can be achieved in the same material as the staples 301', 1410' (i.e. in titanium) or still in a mechanical alloy identical to the forming tool. If the rails 1611, 1711 and 1612, 1712 of the frame 1610, 1710 are in titanium, the isostatic pressing step 1250 will compact the rails 1611, 1711 and 1612, 1712 of the frame 1610, 1710 at the same time as the staples 302, 1401' so as to form a block part including two block shoulders. In this completion model, an additional pick-up operation shall be necessary to machine-flush the surplus of material brought by the rails 1611, 1711 and 1612, 1712, by machining for example.

The isostatic pressing step 1250 can include a cleaning/degreasing step and/or chemical attack on the metal staples 301', 1401' so as to remove residual impurities from the different layers of staples. The advantage of the impurities' cleaning step is the achievement of soaking all staples 301', 1401' positioned on the frame 1610, 1710 in a bath containing cleaning or chemical agent before its positioning in the forming tool 1400, 1500.

In conjunction with the manufacturing of a hollow metal reinforcement, the process according to invention can include an extra step of chemical attack of the insert, introduced between two different layers of staples 301', 1401', and as an integral part of the compacted block part 1430. The chemical attack is achieved by means of a chemical agent able to attack the material in which the insert has been achieved. The chemical attack of the fugitive insert enables the dissolving of the fugitive insert so that the space freed by the dissolved insert forms the internal cavity of the hollow metal reinforcement.

The chemical attack step is best achieved by soaking of the block part 1430 in a bath containing chemical agent capable of dissolving the insert. The chemical agent is an acid or a base for example.

Figure 15:
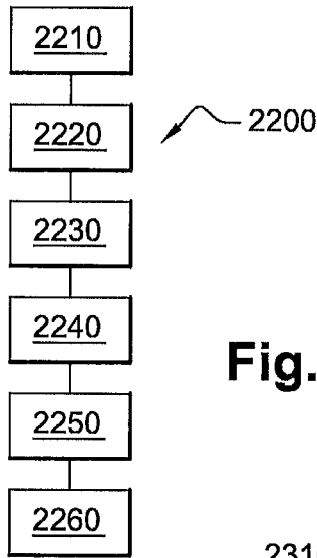
FIG. 15 is a synoptic picture presenting the main steps of a third method for achievement of a turbine engine blade leading edge metal structural reinforcement of the process for achievement according to invention.

Favourably, the chemical agent is capable of dissolving the copper, quartz or even the silicon, Detailed Description of a Third Completion Method FIG. 15 gives a synoptic picture illustrating the main steps of a completion process 2200 for a metal part, for example enabling a blade 10 leading edge metal structural reinforcement 30 to be achieved, as is illustrated in FIGS. 1 and 2.

The first step 2210 of the completion process 2200 is a step for multiple cutting from a metal wire section 301 from a continuous metal wire for example from a network, where each section 301 length is determined according to the final part to be achieved. The metal sections 301 thus cut are illustrated in FIG. 4.

Each metal section 301 can therefore have a specific length according to the part of the metal reinforcement 30 that it represents, the length for overlapping of the sides 35, 37 varying according to the second direction 20 between the foot 22 and the peak 24 of the blade.

The diameter of the metal sections 301 can vary according to the user's needs and the thickness of the material necessary for achievement of the part. The defining of the diameter of the metal sections is achieved in accordance with a compromise between suppleness and the thickness of the material necessary in the machinery.

The metal section is typically formed from a metal wire of circular section but can also be formed from a metal squared, rectangular or hexagonal section, etc.

The second step 2220 of the manufacturing process 2200 is a cold forming step or the forming of metal section 301 cut from the first step 2210. This second step is illustrated in FIG. 5.

This second step 2220 enables each rectilinear metal section 301 to be cold formed (i.e. at ambient temperature) by plastic deformation. This step therefore enables a pre-formed metal section to be obtained 301', known as the follow on staple, whose geometry is determined according to the final part to be achieved and specifically according to the shape of the compacting machinery used for the completion of the final part.

The staples 301' are achieved by deformation of the rectilinear metal sections 301 by means of simple equipment that it is possible to work manually, with the individual deformation of each section not needing consequent hydraulic methods to achieve the deformation of the metal section 301. Fortunately the deformation equipment is a classic deformation tool that is possible to automate and/or calibrate as much as regards the final shape of the metal staples 301' as the pressure force, according to the user's needs.

Thus, the staples 301' can be shaped individually or per packet of multiple metal sections 301.

The metal section deformation step 2220 can thus enable one rectilinear metal section 301 to be passed to a preformed metal section forming a staple 301', including two sensitively rectilinear arms 302 and 303 joined to each other to one of their ends by a part of metal wire forming a junction area 304 having undergone at least one deformation. The length of the arms 302 and 303 can be different for one individual staple 301'. The metal section 301 can also be entirely or partially crushed (for example for a local thickness restriction) during the deformation step.

As regards the achievement of the blade metal reinforcement for a turbine engine, the staples 301' are favourably in a U or V shape.

The staples 301' are achieved from metal wire section of a thickness varying sensitively from 0.1 mm to 5 mm.

According to an invention achievement variant, the cold forming step 2220 can be preceded by an extra operation consisting of pulling a part of each rectilinear metal section's 301 material to achieve a reduction in the metal section's diameter and therefore create a localised oversize. The reduction in diameter is for example achieved by pulling the ends of the metal section while blocking the part of the section's substance where it would be wished to create an oversize. The pulling of substance is just as well achieved hot (i.e. with a device capable of heating the material) as cold (i.e. at ambient temperature).

The advantage of this local oversize of material is the facilitating of the following drilling step of the completion process 2200 according to invention. In accordance with a completion alternative, the operation for pulling a part of the substance can also take place after the cold forming step. As regards this alternative, the reduction in substance can also be obtained by pulling arms 302, 303 of the metal staple 301'.

The oversize of the material is best responsively achieved in the centre of the wire with its two ends. The junction between the central oversize and the ends of the wire is progressive, that is to say that the metal wire includes a constant thickness as regards the two end areas and the central area presenting an oversize and a variable thickness between the central zone and one of the end areas.

According to another completion alternative, the oversize of material is achieved by machining of the rectilinear metal wire 301 or again by chemical attack of the rectilinear metal wire on its two ends.

The third step 2230 of the completion process 2200 is the step for drilling the said multiplicity of metal staples 301' so as to achieve at least one crossing hole 2310. The drilling step is achieved by a laser cutting process or by another well-known type of process enabling the achievement of crossing holes 2310 in a very thin metal staple 301' (i.e. a few millimeters thick).

Figure 16:
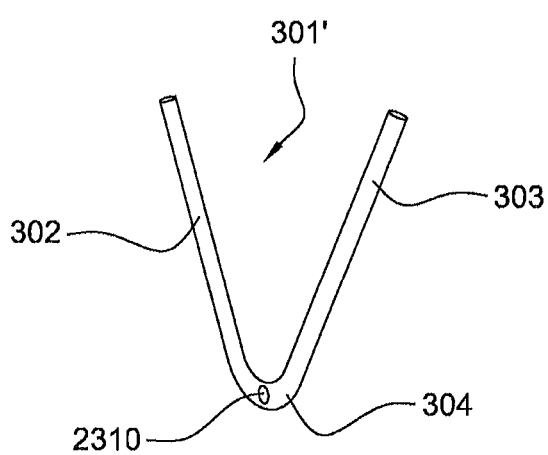
FIG. 16 illustrates a view of the turbine engine blade leading edge metal reinforcement according to a first example of achievement of the third step of the third method of achievement of the process illustrated in FIG. 15.
Figure 17:
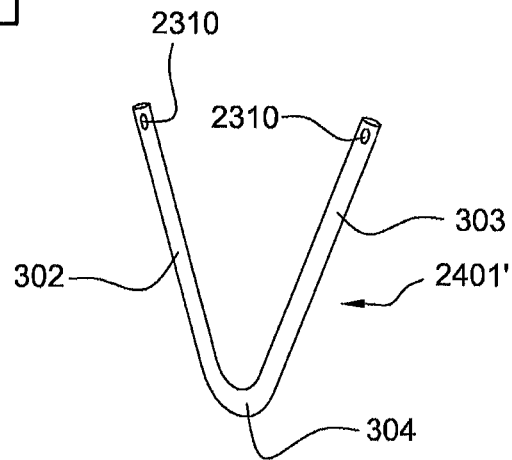
FIG. 17 illustrates a view of the turbine engine blade leading edge metal reinforcement according to a second example of the achievement of the third step of the third method of achievement of the process illustrated in FIG. 15.

In accordance with the first model of completion illustrated in FIG. 16, the drilling of the staple 301' is achieved in the junction area 304 having undergone at least one deformation. According to a completion variant, illustrated in FIG. 17, the drilling is achieved on each of the ends of the arms 302 and 303 of the staple 2401'. The staple 2401' illustrated in FIG. 17 is similar to the staple 301' detailed previously with exception of the positioning of the crossing holes 2310.

According to another completion alternative (not represented), the staples can include a multiplicity of holes crossing 2310 the junction area 304 and/or the arms 302, 303.

Figure 18:
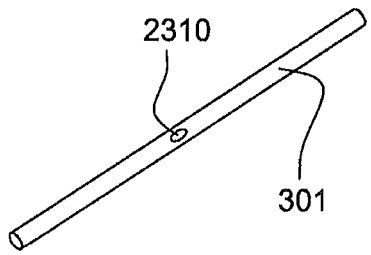
FIGS. 18 and 19 illustrate a view of the turbine engine blade leading edge metal reinforcement of a third completion model for the second and third step of the third method of achievement of the process according to the invention.
Figure 19:
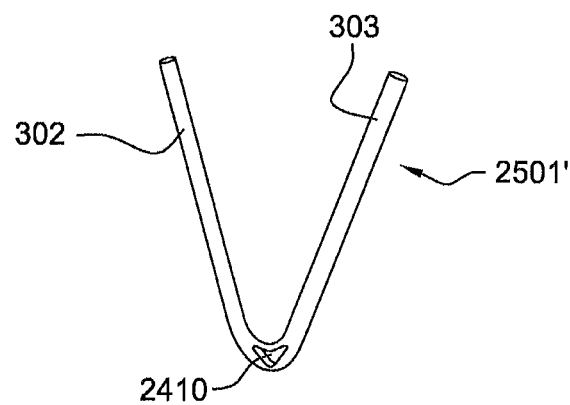

In accordance with the second model of completion illustrated in FIGS. 18 and 19 this drilling step can be achieved prior to the staple cold forming step. A reversal in the unwinding order of the staples can be interesting if, for example, profiting from the deformation of the wire 301 is desired to simultaneously bring a deformation in the crossing hole. Thus for example, a circular hole 2310 achieved in the central part of the metal wire 301 which shall be used to form the junction area 304 of the staple 301', prior to the forming step, shall also be deformed during the deformation of the staple and shall become a cavity 2410 larger than the initial circular hole 2310 with a shape approaching a U or a V.

The fourth step 2240 of the completion process 2200 is a step for the assembling of the plurality of staples 301' so as to achieve a supple metal structure 2320a, 2320b in the form of a garland of metal staples 301' or again a collar formed of a multiplicity of metal staples 301'.

Figure 20:
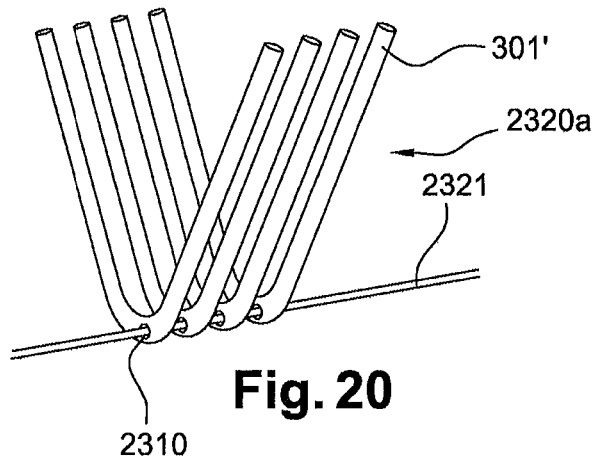
FIG. 20 illustrates a view of the turbine engine blade leading edge metal reinforcement during the fourth step of the third method for achievement of the process illustrated in FIG. 15 according to the first completion model illustrated in FIG. 16.

According to a first completion variant as regards drilling in FIG. 16, the metal structure 2320a is shaped by the threading of at least one metal wire 321 inside the hole 310 in each metal staple 301' among the many staples. The metal structure 2320a in accordance with this completion variant is specifically illustrated in FIG. 20.

Figure 21:
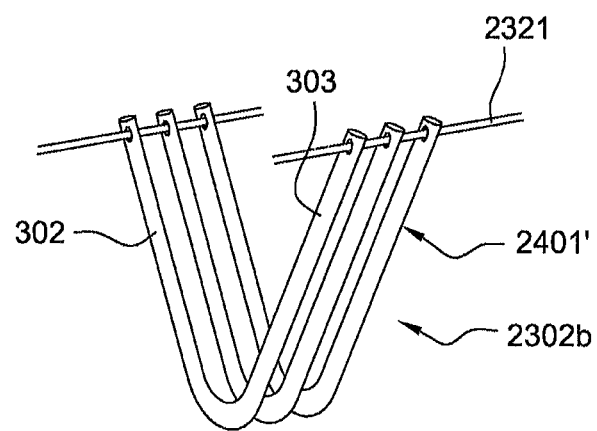
FIG. 21 illustrates a view of the turbine engine blade forward metal reinforcement during the fourth step of the third method for completion of the process illustrated in FIG. 15 according to the second example of achievement illustrated in FIG. 17.

According to a second completion variant as regards drilling in FIG. 17, the metal structure 2320b is shaped by the threading of at least one metal wire 2321 in the inside of each of the holes 2310 situated on each end of each arm 302, 303 of the plurality of staples 2401', This second variant for the completion of the metal structure 2320b is illustrated in FIG. 21.

A second completion model, illustrated in FIG. 19, is favourably used for the insertion of a multiplicity of metal wires 2321 inside the cavity 2410.

The metal structure 2320a, 2320b is thus formed by metal wires 2321 achieving a metal reinforcement and by metal staples 301', 2401' suspended in metal wires 2321. The metal wires 2321 used to achieve the metal structure 2320a, 2320b are preferably titanium based wires in association with the achievement of a turbine engine blade metal reinforcement. However the metal wires 2321 can also be wires coated with boron (SiC-Bore wire) or again silicon carbide wires (SiC-SiC) wire or again metal-ceramic composite wires titanium and silicon carbide (SiC-Ti) based. According to the kind of metal wire 2321 used the metal wire can achieve structural reinforcements in the part to be completed in a localised and punctual manner.

Thus, advantageously, the metal structure 2320a, 2320b can in addition have holes 2310 to be used in the completion of the metal structure 2320a, 2320b and secondary holes distributed specifically on the surface of the metal staples 301', 2401' capable of receiving specific metal wires which shall become structural reinforcements in the part finally achieved.

The metal wires 2321 achieving the metal reinforcement of the metal structure 2320a, 2320b as well as the reinforcements located in the metal structure 2320a, 2320b have diameters less than the diameter of the metal staples 301', 2401'. The metal wires 2321 have a favourable diameter between 0.1 mm and 1 mm inclusively.

The metal wires 2321 can also be replaced by metal cables formed by a multiplicity of metal strands twisted, braided or coiled in propeller around the cable's longitudinal axis. Each metal strand forming the cable includes a diameter of less than 0.1 mm. By way of example, the metal cables can include between 20 and 30 coiled strands. The purpose of metal cables formed by many coiled metal strands is the obtaining of a cable with a large supple and manually cold distortable section (i.e. at ambient temperature for example) and therefore the easy positioning of the different staples 301', 401'.

The metal staples 301' and 2401' forming different layers are mainly achieved from titanium bases metal wires. However it is also possible to incorporate metal staples based on silicon carbide and titanium (SiC-Ti), or boron coated wires (SiC-Bore) wires or Silicon Carbide wires (SiC-SiC) among the titanium based staples 301', 2401' for the metal structure 2320a, 2320b, to the extent that the curve radius of the staples 301', 2401' authorises a deformation of these wires, known as "composite wires", without reaching their rupture limit.

The fifth step 2250 of the completion process 2200 is a step for positioning the metal structure 2320a, 2320b on to the forming tool 2400 including the multiples staples 301', 2401.

The machinery 2400 has a die 2440 with an indentation 2410 corresponding to the final external shape of the metal reinforcement 30 and a punch 2420 corresponding to the final internal shape of the leading edge metal reinforcement.

Figure 22:
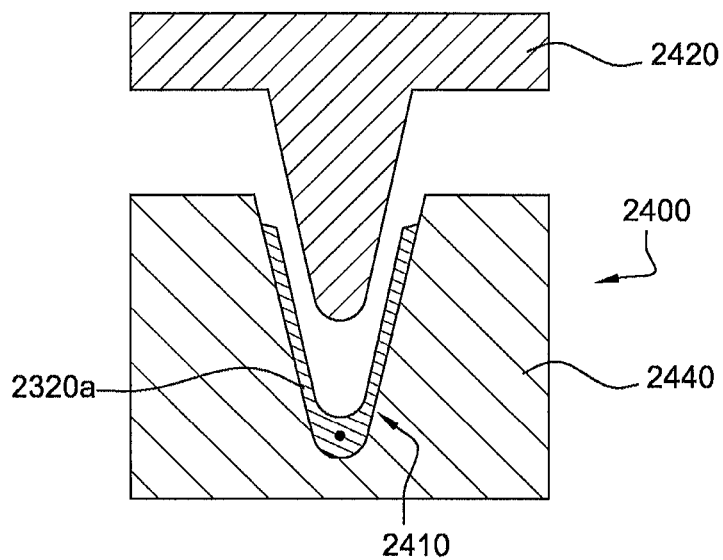
FIG. 22 illustrates a view of the turbine engine blade leading edge metal reinforcement during the fifth step of the process illustrated in FIG. 15.

A model for manufacturing this step 2250 of the completion phase 2200 is illustrated in FIG. 22. According to this achievement model, the metal structure 2320a is placed in the die 2440 of the forming tool 2400. According to another model of completion (not represented), the metal structure 2320a, 2320b can also be positioned on to the punch 2420.

With the staples 301', 2401' including the additional shape of the indentation 2410, the positioning of the supple metal structure 2320a, 2320b is achieved easily and therefore enables the easy achievement of the deposit of metal material onto an indentation 2410 of complex form including two curves according to two separate inclines.

The sixth step 2260 of the completion process 2200, illustrated in FIG. 8, is a hot pressing step for the pile up formed from the different layers of staples 301', 2401' positioned in the forming tool 2400.

According to a favourable completion model, the hot pressing is an isostatic pressing (HIP for Hot Isostatic Pressing in English).

Hot isostatic pressing is a widely used and well known process for reducing porosity in metals and can influence the thickness of numerous materials, in the form of pre-compacted powder, for example. The isostatic pressing process can moreover improve mechanical properties and the workability of materials.

Isostatic pressing is achieved at high temperature (classically between 400° C. and 1400° C. and 1000° C. for titanium) and an isostatic pressure.

Thus, the application of the heat combined with the internal pressure eliminates the empty spaces in the piling up as well as micro-porosities by means of a combination of plastic deformation, creep and diffusion welding so as to form a block part 2430.

The block part 2430 from the isostatic pressing step includes the internal and external outlines of the metal reinforcement 30. The block part 2430 is then removed by the machinery 2400.

The isostatic pressing step is achieved under vacuum, advantageously under secondary vacuum either in welded machinery in which the secondary vacuum is achieved, either in machinery welded in which the second welding is achieved or in an autoclave bag with the choice of process dependent on the number of parts to be produced. The secondary vacuum enables the avoiding of the presence of oxygen molecules in the machinery and in the fibrous structure during the titanium isostatic pressing phase.

According to another completion model, the hot pressing can also be an isothermal forging process under press in an enclosure under vacuum.

The machinery 2400 is achieved in a mechanical alloy known as superalloy or high performance alloy.

The isostatic pressing step 2260 can previously include a cleaning, degreasing step and/or chemical attack of the metal staples 301', 2401' of the metal structure 2320a, 2320b so as to remove residual impurities in the metal structure 2320a, 2320b. Advantageously, the impurities cleaning step is achieved by the soaking of the metal structure 2320a, 2320b in a bath of cleaning agent or chemical agent before its placing in the forming tool 2400.

Detailed Description of a Fourth Method of Completion

FIG. 23 gives a synoptic picture illustrating the main steps of the a process for the completion 3200 of a metal part as a part of achieving for example a blade 10 leading edge metal structural reinforcement 30 such as is illustrated in diagrams 1 and 2.

The first step 3210 of the completion process 3200 is a step for cutting multiple metal sections 301 from a continuous metal wire, from a network for example, where each length of the metal section 301 is determined according to the final part to be achieved. The metal sections 301 thus cut are illustrated in FIG. 4.

Each metal section 301 can therefore have a specific length according to the part of the metal reinforcement 30 that it represents, with the length of overlapping the sides 35, 37 of the reinforcement 30 varying according to the second direction 20 between the foot 22 and the peak 24 of the blade.

The diameter of the metal sections 301 can vary according to the user's needs and the thickness of the material to achieve the part. The diameter is defined in accordance with a compromise between the suppleness and thickness of the material necessary in the machinery.

The sensitively rectilinear metal section is typically formed from a metal wire of circular section but can also be formed from a squared, rectangular, hexagonal, etc. section metal cross section.

The second step 3220 of the manufacturing process 3200 is a cold forming step or the forming of metal section 301 cut during the first step 3210. This second step is illustrated in FIG. 5.

This second step 3220 enables the cold forming (i.e. at ambient temperature) of each rectilinear metal section 301, by plastic deformation, so as to obtain a preformed metal section 301', known as staple, whose geometry is determined according to the final part to be achieved and particularly according to the shape of the compacting machinery used for the completion of the final part.

The staples 301' are achieved by deformation of the rectilinear metal sections 301 by means of a simple tool that can be worked manually, with the individual deformation of each section not needing hydraulic methods for the consequent achieving of deformation. Favourably, the deformation machinery is classic deformation machinery that can be automated and calibrated as much for the final shape of the metal staples 301' as the force of the pressure according to the user's needs.

Thus the staples 301' can be formed individually or from a group of multiple metal sections 301.

The step 3220 for the deformation of sections thus enables the passing of one rectilinear metal section 301 to a pre-formed metal section 301', in the shape of a staple, including two sensitively rectilinear arms 302 and 303 linked to each other by a joining element 304 having undergone at least one deformation. The length of the arms 302 and 303 can be different for one single staple. The metal section 301 can also be partially or entirely crushed (for example for local thickness restriction).

In association with the achievement of a blade metal reinforcement for a turbine engine, the staples 301' are favourably in the shape of a U or a V.

The metal sections 301 enabling the achievement of the staples 301' are mainly from titanium bases wires and have a responsive thickness varying between 0.1 mm and 5 mm.

The third step 3230 of the completion process 3200, illustrated in FIG. 24, is a step for the unifying of a multiplicity of stapes so as to form a three dimensional metal structure 3350.

Advantageously, the metal perform of the part to be completed positioned in the forming tool is formed by multiple three dimensional metal structures 3350, each forming a portion of the metal preform.

The third step 3230 of unification can include a sub-step prior to the positioning of the staples 301' on a moulding template (not represented) with a view to facilitating the unification operations.

The moulding template has an advantageous external geometry capable of conforming with the shaped of the mould of the internal shape of the staples 301' formed in the previous phase.

As regards the achieving a metal reinforcement for a turbine engine blade, the template fortunately has the blade' external shape (i.e. the final internal shape of the metal reinforcement).

The template can also have notches on its external surface capable of defining the positions of the different staples and achieving a pre-maintenance for the staples in position consequently facilitating the different manipulations of the template or again the unification operation for the staples 301'.

The space separating two staples 301' (i.e. the staple positioning step) is defined according to the staple's 301' thickness and needs as regards materials of the part to be completed.

The staples 301' are unified by welding or by the laminating of the metal bands 3310, known as foils, on the arms 302, 303 of the staples 301' so that the assemblage of foils 3310 on the staples 301' enabling the formation of a pre-formed and non-woven metal structure 350 (i.e. not using a weaving loom).

The foils 3310 are cut from at least one leaf or from a low thickness metal strip, that is to say some hundredths of millimeters thick.

When the metal structure 3350 is achieved in titanium, the lamination of the metal foils 3310 in titanium on the staples 301' in titanium can be achieved simply by heating the metal staples 301' and the foils 3310 superimposed under a slightly pressurised atmosphere.

The welding of the foils 3310 on to the staples 301' is achieved by well-known welding methods enabling the welding of small titanium thicknesses. Thus, by way of example, the staples 301' and the foils 3310 are assembled by welding points by an electric point welding process.

According to another achievement model, the welding or the lamination of the staples 301'is achieved with on or one multiplicity of metal wires having a diameter less than the diameter of the metal staples 301' so as to present a certain suppleness and thus to facilitate the assembly of different metal staples 301'. So, by way of example, the metal wires which allow for manufacturing the metal structure 3350 have a diameter varying sensitively between 0.1 mm and 1 mm. These metal wires are favourably in titanium; however it is also possible to use composite wires with a silicon carbide base and coated with titanium (Sic-Ti), silicon carbide based wires and coated with boron (Sic-Boron) or again silicon carbide (SiC-SiC) wires.

The metal sections 301 enabling the achievement of the staples 301' are mainly of titanium based wires. However it is possible to incorporate boron coated wires (SiC-Boron wire) coated wires or non-metallic staples in silicon carbide (SiC-SiC wire) among the staples in titanium of metal staples with a titanium and silicon carbide base (SiC-Ti), to the extent where the curve radius of the sections 301 authorises the deformation of these "composite" wires without breaking them, so as to create structural reinforcements in the part to be achieved in a specific and localised manner.

The fourth step 3240 of the completion process 3200 is a step for positioning the different three dimensional metal structures 3350 achieved during the previous step in a forming tool. The different three dimensional metal structures placed end to end enable a preform of the part to be achieved to be formed which can be easily positioned in complex forming tool.

The forming tool 3400 has an indentation 3410 (die) corresponding to the final external shape of the metal reinforcement 30 and a counter-indentation 3420, 3520 (punch) corresponding to the final internal shape of the leading edge metal reinforcement.

According to a first completion model illustrated in FIG. 25, the positioning step 3240 is achieved by positioning the three dimensional metal structures into the indentation 3410 in the forming tool 3400. The positioning is achieved by the successive positioning of the metal structures 3350 over the entire length of the indentation 3410 (i.e. according to the indentation's longitudinal axis). Each metal structure 3350 forms a portion of the complete preform with each of the metal structures having a multiplicity of staples 301'.

The staples 301', and consequently the three dimensional metal structure 3350, including the additional shape of the indentation 3410 with the positioning step being achieved simply by boxing the different sections (i.e. the different three dimensional metal structures) form the preform. The dividing of the preform into many sections therefore allows for the depositing of a metal substance conforming in shape to the complex shape of the indentation 3410 including two curves in accordance with two separate inclines.

During this positioning step 3240, several layers of metal structures 3350, as is illustrated in FIG. 24, can be superimposed in order to respect the thicknesses of material necessary for the completion of the part which of course can vary.

Of course the shape of the staples 301' and the length of the arms 302, 303 and consequently the shape of the metal structures 3350 of the different layers, can also be adjusted according to the needs of material necessary for manufacturing the metal reinforcement 30.

So as to improve the maintenance of the metal structures 3350 placed in the indentation, the staples fortunately have two shoulders achieved in the cold forming step 3220 on each free end of the staples in a V or U form. The shoulders are achieved by bending of one part of the end of each arm so as to achieved two parts capable of forming supports aiding the positioning of the staples and their maintenance in the indentation.

According to another completion model, the ends, capable of forming shoulders, can also be deformed so that the shoulders have the form of planes with at least one plane surface capable of support on the indentation.

For that end, the forming tool is arranged so as to offer a detachment in the indentation so as to enable the metal structures 3350 to take support in the indentation. In addition, the forming tool's punch has two shoulders on each side in the V shape of the punch capable of coming into position in the detachments arranged in the indentation on shutting the equipment down.

Figure 26:
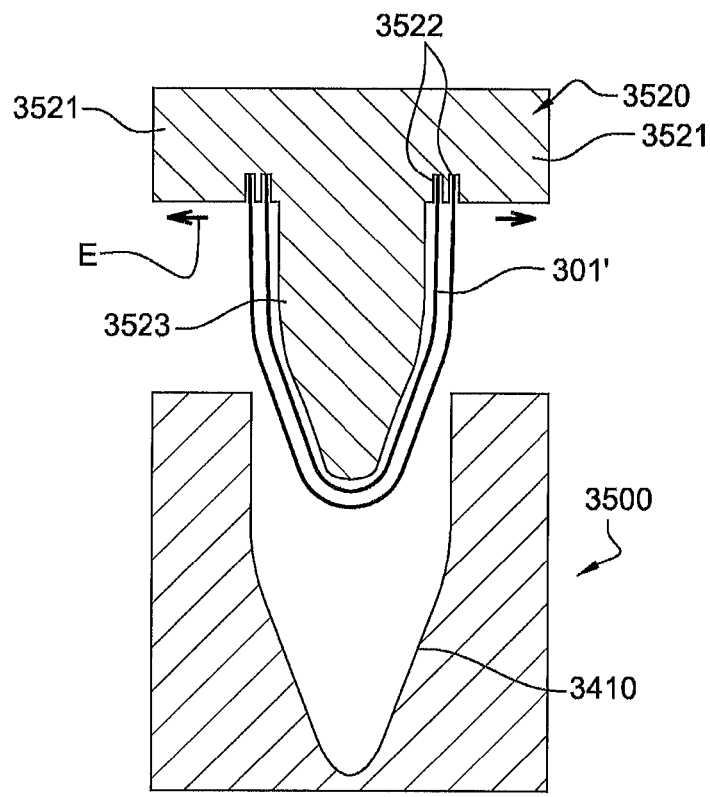
FIG. 26 illustrates a section view of the turbine engine blade leading edge metal reinforcement according to a second example of achievement of the fourth step of the fourth method of achievement of the process illustrated in FIG. 23.

In accordance with a second completion model, illustrated in FIG. 26, the positioning step 3240 is achieved by positioning of the three dimensional metal structures 3350, forming different sections of the preform of the part to be achieved, on the punch 3520 of the forming tool 3500.

For this purpose, the forming tool 3500 includes an indentation 3410 (die) similar to the first completion model, and a counter-indentation 3520 (punch) corresponding to the final internal shape of the leading edge metal reinforcement and including two shoulders 3521 in its upper part on each side of the V-shape 3523 corresponding to the final internal shape of the metal reinforcement. The side of the shoulders 3521, with regard to the inside of the machinery 500, includes housing holes 3522, distributed all along the punch 3520 (i.e. along the longitudinal axis of the punch), capable of receiving the ends of the arms 302, 303 of the staples 301'. These methods 3522 favour the holes whose diameter enables each arm 302, 303 of the staples 301' to be achieved, or the slots extending over the entire length of the punch, or again slots whose length sensitively corresponds to the length of the three dimensional metal structures 3350.

According to this second example of completion, the positioning of the metal structures 3350 on to the punch 3520 is achieved by the successive positioning of metal structures 3350 and by the housing of the arms 302, 303 of the staples 301' of each structure 3350 in housing methods 3522 located on each side of the V shape 3523 of the punch 3520. The maintenance of the three dimensional metal structures 3350 in position is achieved by using the arms' 302, 303 of the staples 301' elastic property which exert a pressure against the walls of the housing 3522 by elastic return.

Favourable and to guarantee that the staples 301' are kept in good position to form the metal structure 3350, the forming of the staples during the second step 220 is achieved in order to obtain staples 301' in position of rest (i.e. without external constraint), whose gap between the two arms 302, 303 is larger or smaller than the gap between the methods of housing 3522 situated on each side of the V-shape 3523 of the punch 3520, Thus, when the gap of the arms 302, 303 in rest position is greater than the gap for housing holes 3522, the metal structures 3350 are kept housed by the elastic return of the arms 302, 303 which exert a force by elastic return against the walls of the housing 3522, in accordance with the direction illustrated by E-referenced arrows to find their position of rest.

Inversely, when the gap of the branches 302, 303 in rest position is lower than the gap for the housing holes 3522, the metal structures 3350 are kept housed by elastic return of the 302, 303 which exert a force by elastic return against the walls of the housing 3522, in accordance with the direction illustrated by E-referenced arrows to find their position of rest.

Several layers of staples, such as is illustrated in FIG. 26, can be superimposed in order to respect the thicknesses of the material needed to achieve the part. The shape of the metal structures 3350 of the different layers can also be adjusted according to the needs of the material needed to achieve the metal reinforcement 30.

Figure 27:
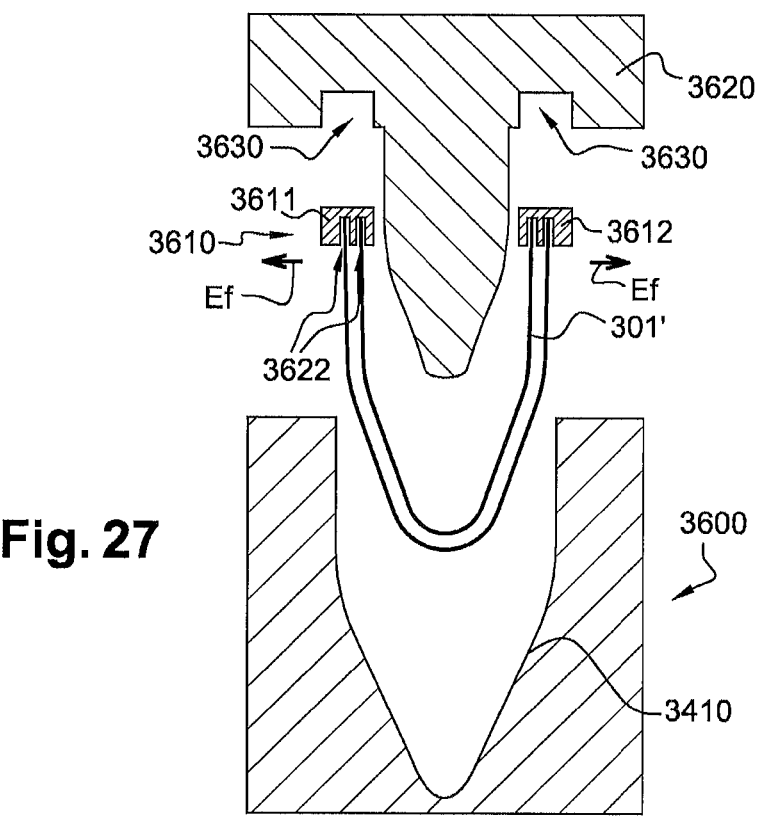
FIG. 27 illustrates a section view of the turbine engine blade leading edge metal reinforcement according to a third example of the achievement of the fourth step of the fourth method of achievement of the process illustrated in FIG. 23.

According to a third completion model illustrated in FIG. 27, the positioning step 3240 is achieved by the positioning of three dimensional metal structures 3350, forming different sections of the preform of the part to be completed, on a frame 3610 formed by two rails 3611, 3612 following the neutral fibre of the part to be completed.

The rails 3611, 3612 have housing holed 3622 for maintenance of the metal structures 3350 using the elastic property of the arms 302, 303 of the staples 301' which exert a pressure against the walls of the housing 3622 by elastic return.

Thus, in a way that is similar to the completion model described previously, when the gap for the arms 302, 303 of the staples 301' in rest position is greater than the gap for the housing 3622 of the rails 3611, 3612, the metal structures 3350 are kept housed by elastic return of the arms 302, 303 which exert a force by elastic return, in accordance with the direction illustrated by E-referenced arrows to find their position of rest.

Inversely, when the gap for the arms 302, 303 of the staples 301' in rest position is lower than the gap for the housing 3622 of the rails 3611, 3612, the metal structures 3350 are kept housed by elastic return of the arms 302, 303 which exert a force by elastic return, in accordance with the direction illustrated by E-referenced arrows to find their position of rest.

In this completion model, the positioning step 3240 includes an extra sub-step for the positioning of the frame 3610 in which the three dimensional metal structures 3350 are housed in the forming tool's 3600 punch 3620 illustrated in FIG. 27, with the punch presenting, for this purpose, grooves 3630 in the form of slots capable of receiving the frame.

The geometry of the grooves 3630 is very evidently dependent and additional to the geometry of the rails 3611, 3612 of the frame 3610.

The rails 3611, 3612 of the frame 3610 are kept in the grooves 3630 of the punch by classic maintenance methods, such as measuring rods for example, screwing methods or again cold adjustment.

The step 3240 for the positioning of different levels of three dimensional structures 3350 can also include a sub-step for the insertion of an insert between two successive layers of metal structures 3350 so as to supply for example an oversize of local material more consequent or variable, a specific reinforcement achieved in a specific material or again to achieve a hollow metal part, such as a hollow metal reinforcement.

By way of example, the insert can be a block insert achieved by forging, machining or by casting, or an insert achieved by the weaving of metal wires for example with titanium wires and/or titanium and silicon carbide (SiC-Ti) based wires, and/or boron coated wires (SiC-Boron) or again silicon carbide (SiC-SiC).

Whatever kind of material is used to achieve the insert inserted between the different layers, it is necessary that this material is compatible with the kind of material used for manufacturing metal structures 3350 and has properties for superplastic formation and diffusion welding.

In order to achieve a hollow metal reinforcement (not represented), the insert is a fugitive insert achieved in a material different from the material used for manufacturing the metal staples 301'.

A "fugitive insert" means an insert which is not intended to be permanent and which is only necessary for manufacturing a leading edge hollow metal reinforcement. The fugitive insert is therefore not present in the metal reinforcement in its final state and does not participate in any of the mechanical characteristics of the metal reinforcement.

The fugitive insert is for example achieved in a material capable of resisting a high temperature of 900° C. and a high pressure of 1000 bar, and which is compatible with metal staple 301' material so as not to create impurities or oxidation.

The material of the fugitive insert must also be able to be attacked chemically by chemical agent dissolution.

Advantageously, the fugitive insert is achieved in copper, quartz or in silicon.

The shape of the fugitive insert incorporated in the piling up of the layers of staples 3350 is dependent on the shape of the desired final internal cavity.

The fifth step 3250 of the completion process 3200, illustrated in FIG. 8, is a hot isostatic pressing step (HIP for Hot Isostatic Pressing in English) for piling up by the different layers of staples positioned in the machinery 3400, 3500, 3600.

The hot isostatic pressing is a well-used manufacturing process and well known for reducing the porosity of metals and influencing the thickness of numerous metals in the form of pre-compacted powder for example. The isostatic pressing process in addition enables the improvement of mechanical properties and the workability of materials.

Isostatic pressing is achieved at high temperature (classically between 400° C. and 1400° C. and 1000° C. for titanium) and at isostatic pressure.

Thus, the application of the heat combined with the internal pressure eliminates the empty spaces in the piling up as well as micro-porosities by means of a combination of plastic deformation, creep and diffusion welding so as to form a block part 3430.

The block part 3430 from the isostatic pressing step includes the internal and external outlines of the metal reinforcement 30. The block part 3430 is then removed by machinery 3400, 3500, 3600.

The isostatic pressing step is achieved under vacuum, best under a secondary vacuum either in welded machinery in which the secondary vacuum is achieved, or in an autoclave bag with the choice of process dependent on the number of parts to be produced. The secondary vacuum enables the avoiding of the presence of oxygen molecules in the machinery and in the fibrous structure during the isostatic pressing phase for titanium.

According to another completion model, the hot pressing can also be an isothermal forging process under press in an enclosure under vacuum.

The machinery 3400, 3500, 3600 is achieved in a mechanical alloy known as a superalloy or high performance alloy.

In accordance with the third completion model illustrated in FIG. 27, the rails 3611, 3612 of the frame 3610 can be achieved in the same material as the staples 301' of the metal structures 3350 (i.e. in titanium) or again in a mechanical alloy, identical to the forming tool. If the rails 3611, 3612 of the frame 3610 are in titanium, the isostatic pressing step 3250 shall compact the rails 3611, 3612 of the frame 3610 and the different metal structures 3350 so as to form a block part including two block shoulders. In this completion model, a pick-up operation shall be necessary to remove, by machining for example, the surplus of material formed by the rails.

The isostatic pressing step 3250 can previously include a cleaning or degreasing step and/or a chemical attack on the metal structures 3350 so as to remove residual impurities from the different layers of staples.

The cleaning of impurities step is favourably carried out by the soaking of the different metal structures 3350 in a bath of cleaning agent or chemical agent.

In association with the manufacturing of a hollow metal reinforcement, the process according to invention can include an additional step of subjecting the insert, introduced between the different layers of metal structures 3350 and an integral part of the compacted block part 430 to chemical attack. The chemical attack is achieved by means of a chemical agent capable of attacking the material in which the insert is achieved. The chemical attack on the fugitive insert enables the dissolution of the fugitive insert so that the space released by the dissolved insert forms the internal cavity of the hollow metal reinforcement. Fortunately the chemical attack step is achieved by soaking the block part 430 in a bath containing chemical agent capable of dissolving the insert. The chemical agent is for example an acid or a base.

The chemical agent can favourably be capable of dissolving copper, quartz or again silicon.

In association with these different steps of completion of the different completion methods described, the process according to invention can also include a finishing process and pick-up by machining of the block part obtained in the outlet of the machinery so as to obtain the reinforcement 30.

This pick-up step includes:
- a step for the pick-up of the outline of the base 39 of the reinforcement 30 so as to refine it and specifically the aerodynamic outline of the leading edge 31;
- a step for the pick-up of the sides 35, 37; this step in particular consists of the silhouetting of the flanks 35, 37 and the thinning of the lower surface and upper surface flanks;
- a finishing step enabling the state of surface required to be obtained.

In association with the main completion steps, the process according to invention can also include steps of non-destructive checking of the reinforcement 30 assuring the geometrical and metallurgical compliance of the unit obtained. By way of example the destructive checks can be carried out by X-ray.

The present invention has been mainly described with the use of three titanium based metal sections; however, the completion process also applies to any metal substance with properties that allow superplastic formation and/or diffusion welding.

The invention specifically describes the achievement of a metal reinforcement for a composite blade for a turbine engine; however, the invention also applies to the achievement of a turbine engine's metal blade metal reinforcement.

The invention has been specifically described for manufacturing a turbine engine's blade leading edge metal reinforcement; however the invention is also applicable for manufacturing a turbine engine's blade trailing edge metal reinforcement or again the achievement of a composite or metal propeller metal reinforcement.

The other advantages of the invention are in particular the following:
reduced completion costs;
reduced completion time;
simplifying of the manufacturing range;
a reduction in the costs of materials.

The invention claimed is:

1. A process for manufacturing a metal part, comprising:
    positioning a plurality of metal staples in a forming tool presenting a die and a punch with said plurality of metal staples being metal sections in a rectilinear shape bended in a shape of a U or a V;
    after positioning the plurality of metal staples in the forming tool, hot isostatic pressing said plurality of metal staples causing agglomeration of the plurality of metal staples so as to obtain a compact metal part,
    wherein the positioning of said plurality of metal staples is achieved by placing at least two metal staples of said plurality of metal staples at different times in the die or on the punch of said forming tool.

2. The process for manufacturing a metal part according to claim 1, wherein the positioning of said plurality of metal staples includes a first sub-step for pre-positioning of said plurality of metal staples on to a detachable frame so that said plurality of metal staples are suspended in said detachable frame and a second sub-step of positioning of the detachable frame, including the plurality of staples, in a groove arranged in the forming tool.

3. The process for manufacturing a metal part in accordance with claim 2, wherein said detachable frame is formed of two rails so that during the second sub-step of positioning said detachable frame, each of said rails of said detachable frame is capable of being inserted into a notch arranged in said forming tool with said notches forming said groove of said forming tool.

4. The process for manufacturing a metal part according to claim 3, wherein said notches are arranged in the die of said forming tool so that said detachable frame is placed in said die during said positioning.

5. The process for manufacturing a metal part according to claim 1, wherein said positioning of said plurality of metal staples includes a first sub-step for manufacturing a metal structure formed by an assembly of said plurality of metal staples presenting a crossing hole and by at least one metal wire introduced in said crossing hole of each metal staple of said plurality of metal staples and by a second sub-step for positioning said metal structure in the forming tool.

6. The process for manufacturing a metal part according to claim 5, comprising manufacturing said crossing hole of each metal staple.

7. The process for manufacturing a metal part according to claim 6, wherein said crossing hole is achieved by laser drilling, at a time of said manufacturing of said crossing hole.

8. The process for manufacturing a metal part according to claim 1, wherein, prior to the positioning, the process further comprises manufacturing said plurality of metal staples by bending the metal sections of rectilinear shape.

9. The process for manufacturing a metal part according to claim 8, wherein the metal sections are metal wires.

10. The process for manufacturing a metal part according to claim 9, wherein the metal wires have a circular section, a square section, a rectangular section or a hexagonal section.

11. The process for manufacturing a metal part according to claim 1, wherein the positioning of said plurality of metal staples includes a first sub-step for manufacturing multiple three dimensional metal structures by fixing the plurality of metal staples, each of said three dimensional metal structures forming a portion of a preform of said metal part to be achieved and a second sub-step for positioning said three dimensional metal structures in the forming tool.

12. The process for manufacturing a metal part according to claim 1, wherein said sub-step for manufacturing the multiple three dimensional metal structures is achieved by welding or by lamination of said plurality of metal staples.

13. The process for manufacturing a metal part according to claim 11, wherein said sub-step for manufacturing the multiple three dimensional metal structures is achieved by welding or lamination of a metal foil on said plurality of metal staples forming the three dimensional metal structure with said metal foil linking each said plurality of metal staple of the three dimensional metal structure.

14. The process for manufacturing a metal part according to claim 1, wherein the metal staples of said plurality of metal staples are placed, metal staple by metal staple, in the die of said forming tool or are placed, metal staple by metal staple, on the punch of said forming tool.

15. The process for manufacturing a metal part according to claim 14, wherein said positioning of said plurality of metal staples is achieved by clamping arms of said metal staples in clamping means arranged in said punch, said clamping being achieved by elastic deformation of said arms.

16. The process for manufacturing a metal part according to claim 1, wherein said process is a process for manufacturing a metal reinforcement for leading edge or trailing edge of a turbine blade or a metal reinforcement for a propeller so that said metal part obtained in said isostatic pressing is a metal reinforcement.

17. The process for manufacturing a metal part according to claim 1, wherein said positioning of said plurality of metal staples includes a first sub-step for pre-positioning the plurality of metal staples, metal staple by metal staple, on a moulding template and a second sub-step for positioning of said plurality of metal staples, pre-positioned on said moulding template, in said forming tool.

18. The process for manufacturing a metal part according to claim 1, comprising manufacturing said plurality of metal staples by bending metal sections, of a rectilinear shape, by cold forming.

19. The process for manufacturing a metal part according to claim 1, wherein said metal part is a metal reinforcement for turbine engine blade.

\* \* \* \* \*